(12) United States Patent
Yu et al.

(10) Patent No.: US 10,154,282 B2
(45) Date of Patent: Dec. 11, 2018

(54) METHOD AND DEVICE FOR GENERATING PREDICTED PICTURES

(71) Applicants: ZHEJIANG UNIVERSITY, Hangzhou, Zhejiang Province (CN); ZTE Corporation, Shenzhen (CN)

(72) Inventors: Lu Yu, Shenzhen (CN); Yichen Zhang, Shenzhen (CN); Yin Zhao, Shenzhen (CN); Yingjie Hong, Shenzhen (CN); Ming Li, Shenzhen (CN)

(73) Assignee: SHANGHAI ZHONGXING SOFTWARE COMPANY LIMITED, Shanghai (CN)

( * ) Notice: Subject to any disclaimer, the term of this patent is extended or adjusted under 35 U.S.C. 154(b) by 438 days.

(21) Appl. No.: 14/441,445

(22) PCT Filed: Sep. 6, 2013

(86) PCT No.: PCT/CN2013/083084
§ 371 (c)(1),
(2) Date: May 7, 2015

(87) PCT Pub. No.: WO2014/048242
PCT Pub. Date: Apr. 3, 2014

(65) Prior Publication Data
US 2015/0296219 A1 Oct. 15, 2015

(30) Foreign Application Priority Data
Sep. 29, 2012 (CN) .......................... 2012 1 0376819

(51) Int. Cl.
*H04N 19/583* (2014.01)
*H04N 19/597* (2014.01)
(Continued)

(52) U.S. Cl.
CPC ......... *H04N 19/583* (2014.11); *H04N 19/105* (2014.11); *H04N 19/167* (2014.11);
(Continued)

(58) Field of Classification Search
CPC .... H04N 19/61; H04N 19/176; H04N 19/105; H04N 19/51; H04N 19/46; H04N 19/117;
(Continued)

(56) References Cited

U.S. PATENT DOCUMENTS

| | | | |
|---|---|---|---|
| 2009/0103616 A1 | 4/2009 | Ho | |
| 2011/0044550 A1* | 2/2011 | Tian | ...... H04N 19/597 382/238 |
| 2013/0156328 A1* | 6/2013 | Wang | ...... G06K 9/4642 382/203 |

FOREIGN PATENT DOCUMENTS

| | | |
|---|---|---|
| CN | 1494804 A | 5/2004 |
| CN | 101521823 A | 9/2009 |
| CN | 102138333 A | 7/2011 |

OTHER PUBLICATIONS

International Search Report for corresponding application PCT/CN2013/083084 filed Sep. 6, 2013; dated Dec. 19, 2013.
(Continued)

*Primary Examiner* — Farhan Mahmud
(74) *Attorney, Agent, or Firm* — Cantor Colburn LLP

(57) ABSTRACT

Disclosed are a method and device for generating a predicted picture, the method comprising: determining a reference rectangular block of pixels according to parameter information which includes a location of a target rectangular block of pixels and/or depth information of a reference view; mapping the reference rectangular block of pixels to a target view according to the depth information of the reference view to obtain a projection rectangular block of pixels; and acquiring a predicted picture block from the projection rectangular block of pixels. The technical problem of rela-
(Continued)

tively large dependence among the data brought by simultaneously employing the depth picture of the target view and the depth picture of the reference view in the process of generating the predicted picture in the prior art is solved, and the technical effects of reducing the dependence on the data and improving the encoding and decoding efficiency is achieved.

19 Claims, 6 Drawing Sheets

(51) Int. Cl.
    *H04N 19/105*     (2014.01)
    *H04N 19/167*     (2014.01)
    *H04N 19/176*     (2014.01)
    *H04N 19/52*     (2014.01)
    *H04N 19/157*     (2014.01)

(52) U.S. Cl.
    CPC ........... *H04N 19/176* (2014.11); *H04N 19/52* (2014.11); *H04N 19/597* (2014.11); *H04N 19/157* (2014.11)

(58) Field of Classification Search
    CPC .. H04N 19/139; H04N 19/159; H04N 19/103; H04N 19/172; H04N 19/80; H04N 19/577; H04N 19/57; H04N 19/17; G06T 2207/10016
    See application file for complete search history.

(56) References Cited

OTHER PUBLICATIONS

Dong, Tian et al.: "3D-CE1.A Related Proposal for Synthethic Reference Refinement"; Motion Picture Expert Group, IEEE, Jun. 7, 2012, XP030053278; pp. 4.

Hannuksela, et al.: "Test Model for AV-Based 3D Video Coding V2.0" Internaional Organisation for Standardisation Organisation Internationale De Normalisation ISO/IEC JTC1/SC29/WG11 Coding of Moving Pictures and Audio, Jul. 2012, pp. 22.

Shimizu, et al.: "CE1.a Related Results on the Modification of In-Loop View Synthesis"; Joint Collaborative Team on 3D Video Coding Extension Developement of ITU-T SG 16 WP 3 and ISO/IEC JTC 1/SC 29/WG 11; Oct. 2012; pp. 6.

Shimizu, et al.: "Free-Viewpoint Scalable Multi-View Video Coding Using Panaramic Mosaic Depth Maps"; 2006 14th European Signal Processing Conference, IEEE, Aug. 25, 2008, XP032761114; pp. 5.

Shimizu, et al.: "Improved View Synthesis Prediction Using Decoder-Side Motion Derivation for Multiview VISEO Coding"; 2010; pp. 4

Shimizu, et al.: "View Scalable Multiview Video Coding Using 3-D Warping With Depth Map"; IEEE Transaction on Circuits and Systems for Video Technology, vol. 17, No. 11; Nov. 2007; pp. 12.

Supplemental European Search Report Application No. EP13841502; dated Aug. 24, 2015; pp. 12.

Wenyi, Su et al.: "3D-CE1.a Block-Based View Synthesis Prediction for 3DV-ATM" Joint Collaborative Team on 3D Video Coding Extension Developement, Jul. 16-20, 2012, pp. 6.

Wenyi, Su et al.: 3D-CE1.a Related: Low Complexity Block-Based View Synthesis Prediction, Internaional Organisation for Standardisation Organisation Internationale De Normalisation; Apr. 2012, pp. 6

Yichen Zhang, et al.: "CE1.a Related Results on Forward Warping Block-Based VSP"; Joint Collaborative Team on 3D Video Coding Extension Developement of ITU-T SG 16 WP 3 and ISO/IEC JTC 1/SC 29/WG 11; Oct. 2012; pp. 10.

\* cited by examiner

METHOD AND DEVICE FOR GENERATING PREDICTED PICTURES

TECHNICAL FIELD

The present invention relates to the field of communications, and in particular to a method and device for generating a predicted picture.

BACKGROUND

Picture prediction refers to the case where, by means of information such as motion vectors and reference frame indexes, a part of a picture is copied directly or acquired by means of methods such as sub-pixel interpolation from the picture which has been encoded/decoded to serve as a predicted picture of the current encoded/decoded picture block in the video encoding/decoding process. At an encoding end, a picture residual can be obtained by subtracting the predicted picture and the original picture and the picture residual is encoded and written into a code stream; and at a decoding end, a reconstructed picture can be obtained by adding the predicted picture and the picture residual obtained through decoding from the code stream. Encoding/decoding performed in this way of predicting a picture can effectively improve the efficiency of encoding/decoding.

At present, a common method for generating a predicted picture is a method in which a forward projection is used, i.e. it means that depth information of each pixel or each block of pixels in a reference view is utilized to project a picture of the reference view to a target view so as to obtain a picture of the target view. Currently, a common block-based forward projection is generally implemented in the following way:

In order to generate one target block of pixels Bt in the target view, the size and location of a reference block of pixels Br for generating Bt in the reference view are determined by the size and location of Bt and a depth value corresponding to each pixel in Bt, that is, the reference block of pixels needs to be determined by means of depth information of the target view in the method.

In the above-mentioned method, a set of new boundary values are obtained by subtracting Dmax from the left boundary of Bt, subtracting Dmin from the right boundary of Bt, and keeping the upper and lower boundaries unchanged, where Dmax and Dmin are respectively the statistical maximum value and minimum value of disparity values derived by converting the depth values corresponding to the pixels in Bt. The new boundary values are set as Br boundary values. The Br is projected to the target view, and pixels in Bt without projected ones from Br are filled to obtain the final projected Bt. Bt is taken as a predicted picture. Depth information of the reference view is employed in the process of projection to generate a desired predicted picture.

The above-mentioned hole filling means that holes will appear after a virtual view projection is performed on places with depth changes, such as boundary regions of objects in the picture. After the picture of the projected view is projected to the target view, a single point or successive point section in the target view without projected pixels from the reference view is called a hole. The appearance of holes is related to the sampling rate of depth and texture, as well as the occultation relationship among objects in a three-dimensional scene. Scenes located behind objects cannot be acquired by a camera, and thus the scene originally located behind the objects cannot be constructed using projection. When holes appear, hole filling techniques need to be used to fill the holes in the projected picture so as to make it complete. The hole filling method is generally to fill the entire empty hole with a pixel value of two projected pixels belonging to a background region at two sides of the empty hole (based on a relationship between a relative foreground and background of the two pixels). If only one side of the hole has a projected pixel (which generally appears on the picture boundaries), this projected pixel is used to fill the entire hole. The above-mentioned method is only one of the empty hole filling techniques, and many other methods can also be used for implementation.

It can be seen from the above-mentioned description that, in the prior art, when performing forward projection, depth information of a reference view is used to determine the reference block of pixels, and depth information of a target view is used for projection. Therefore, the depth information of the target view and the depth information of the reference view need to be used simultaneously in the predicted picture generation process, which brings relative large dependence among data.

Aiming at the above-mentioned problem, no effective solution has been presented.

SUMMARY

The embodiments of the present invention provide a method and device for generating a predicted picture, so as to at least solve the technical problem of relatively large dependence among data brought by simultaneously employing depth information of a target view and depth information of a reference view in the process of generating the predicted picture in the prior art.

According to one aspect of the present invention, provided is a method for generating a predicted picture, comprising: determining a reference rectangular block of pixels according to parameter information, wherein the above-mentioned parameter information comprises a location of a target rectangular block of pixels and/or depth information of a reference view; mapping the above-mentioned reference rectangular block of pixels to a target view by means of the depth information of the above-mentioned reference view to obtain a projected rectangular block of pixels; and acquiring a predicted picture block from the above-mentioned projected rectangular block of pixels.

Alternatively, the depth information of the above-mentioned reference view comprises at least one of the following: depth pictures of the above-mentioned reference view and camera parameters of the above-mentioned reference view.

Alternatively, the above-mentioned reference rectangular block of pixels can be projected to the target view using a forward projection.

Alternatively, when the above-mentioned parameter information comprises the location of the target rectangular block of pixels, determining the reference rectangular block of pixels according to the parameter information comprises: taking a value which is obtained after subtracting a first predetermined offset value from a left boundary value of the above-mentioned target rectangular block of pixels as a left boundary value of the above-mentioned reference rectangular block of pixels; taking a value which is obtained after subtracting a second predetermined offset value from a right boundary value of the above-mentioned target rectangular block of pixels as a right boundary value of the above-mentioned reference rectangular block of pixels; taking an upper boundary value of the above-mentioned target rectangular block of pixels as an upper boundary value of the above-mentioned reference rectangular block of pixels; taking a lower boundary value of the above-mentioned target rectangular block of pixels as a lower boundary value of the above-mentioned reference rectangular block of pixels; and taking the determined left boundary value, right boundary value, upper boundary value and lower boundary value of the reference rectangular block of pixels as boundary information of the above-mentioned reference rectangular block of pixels, so as to determine the above-mentioned reference rectangular block of pixels in the reference view.

Alternatively, the above-mentioned first predetermined offset value and the above-mentioned second predetermined offset value are respectively one preset numerical value that is not 0.

Alternatively, when the above-mentioned parameter information comprises the location of the target rectangular block of pixels and the depth information of the reference view, determining the reference rectangular block of pixels according to the parameter information comprises: determining a first set of boundary values of the above-mentioned reference rectangular block of pixels according to the location of the above-mentioned target rectangular block of pixels; updating the above-mentioned first set of boundary values according to the depth information of the above-mentioned reference view, and taking results obtained after the update as a second set of boundary values of the above-mentioned reference rectangular block of pixels, wherein the area of the reference rectangular block of pixels corresponding to the above-mentioned second set of boundary values is smaller than the area of the reference rectangular block of pixels corresponding to the above-mentioned first set of boundary values; and determining the above-mentioned reference rectangular block of pixels in the reference view according to the above-mentioned second set of boundary values.

Alternatively, determining a first set of boundary values of the above-mentioned reference rectangular block of pixels according to the location of the above-mentioned target rectangular block of pixels comprises: taking a value which is obtained after subtracting a third predetermined offset value from the left boundary value of the above-mentioned target rectangular block of pixels as a left boundary value in the above-mentioned first set of boundary values of the above-mentioned reference rectangular block of pixels; taking a value which is obtained after subtracting a fourth predetermined offset value from the right boundary value of the above-mentioned target rectangular block of pixels as a right boundary value in the above-mentioned first set of boundary values of the above-mentioned reference rectangular block of pixels; taking the upper boundary value of the above-mentioned target rectangular block of pixels as an upper boundary value of the above-mentioned first set of boundary values; and taking the lower boundary value of the above-mentioned target rectangular block of pixels as a lower boundary value of the above-mentioned first set of boundary values.

Alternatively, the above-mentioned third predetermined offset value and the above-mentioned fourth predetermined offset value are respectively one preset numerical value that is not 0.

Alternatively, the above-mentioned third predetermined offset value comprises a maximum disparity value between the above-mentioned reference view and the above-mentioned target view; and the above-mentioned fourth predetermined offset value comprises a minimum disparity value between the above-mentioned reference view and the above-mentioned target view.

Alternatively, updating the above-mentioned first set of boundary values according to the depth information of the above-mentioned reference view comprises: determining one or more boundary range values according to location information of one or more pixels on boundaries of the above-mentioned target rectangular block of pixels and the depth information of the above-mentioned reference view, wherein the above-mentioned boundary range values comprise left boundary range values and/or right boundary range values; and updating the above-mentioned first set of boundary values according to the determined one or more boundary range values.

Alternatively, updating the above-mentioned first set of boundary values according to the determined one or more boundary range values comprises: selecting one from the one or more left boundary range values as the left boundary value in the above-mentioned first set of boundary values, wherein the above-mentioned left boundary range value is a boundary range value corresponding to pixels on a left boundary of the above-mentioned target rectangular block of pixels; and/or selecting one from the one or more right boundary range values as the right boundary value in the above-mentioned first set of boundary values, wherein the above-mentioned right boundary range value is a boundary range value corresponding to pixels on a right boundary of the above-mentioned target rectangular block of pixels.

Alternatively, the steps of determining one or more left boundary range values according to the location information of one or more pixels on the boundaries of the above-mentioned target rectangular block of pixels and the depth information of the above-mentioned reference view comprise: selecting one pixel on the left boundary of the above-mentioned target rectangular block of pixels as a first pixel; taking the left boundary value in the above-mentioned first set of boundary values as the left boundary range value corresponding to the first pixel; taking a first coordinate obtained after offsetting the coordinate of the above-mentioned first pixel by one default disparity as a second coordinate in the above-mentioned reference view; determining a first projection coordinate of a pixel corresponding to the above-mentioned second coordinate in the above-mentioned target view according to depth information of a pixel corresponding to the above-mentioned second coordinate in the above-mentioned reference view; and when a horizontal component of the above-mentioned first projection coordinate is less than or equal to the left boundary value in the above-mentioned first set of boundary values, updating the left boundary range value corresponding to the above-mentioned first pixel to be a horizontal component of the above-mentioned second coordinate; and/or determining one or more right boundary range values according to the location information of one or more pixels on the boundaries of the above-mentioned target rectangular block of pixels and the depth information of the above-mentioned reference view comprises: selecting one pixel on the right boundary of the above-mentioned target rectangular block of pixels as a second pixel; taking the right boundary value in the above-mentioned first set of boundary values as the right boundary range value corresponding to the above-mentioned second pixel; taking a third coordinate obtained after offsetting the coordinate of the above-mentioned second pixel by one default disparity as a fourth coordinate in the above-mentioned reference view; determining a second projection coordinate of a pixel corresponding to the above-mentioned fourth coordinate in the above-mentioned target view according to depth information of a pixel corresponding to the above-mentioned fourth coordinate in the above-mentioned reference view; and when a horizontal component of the above-mentioned second projection coordinate is greater than or equal to the right boundary value in the above-mentioned first set of boundary values, updating the right boundary range value corresponding to the above-mentioned second pixel to be a horizontal component of the above-mentioned fourth coordinate.

Alternatively, the above-mentioned default disparity is a disparity value corresponding to one depth value between the above-mentioned reference view and the above-mentioned target view.

Alternatively, when it is judged that the condition that the horizontal component of the above-mentioned first projection coordinate is less than or equal to the left boundary value in the above-mentioned first set of boundary values is not satisfied, or after the left boundary range value corresponding to the above-mentioned first pixel is updated to be the horizontal component of the above-mentioned second coordinate, the above-mentioned method further comprises: updating the left boundary range value corresponding to the above-mentioned first pixel; when it is judged that the condition that the horizontal component of the above-mentioned second projection coordinate is greater than or equal to the right boundary value in the above-mentioned first set of boundary values is not satisfied, or after the right boundary range value corresponding to the above-mentioned second pixel is updated to be the horizontal component of the above-mentioned fourth coordinate, the above-mentioned method further comprises: updating the right boundary range value corresponding to the above-mentioned second pixel.

Alternatively, updating the left boundary range value corresponding to the above-mentioned first pixel comprises: updating the above-mentioned second coordinate to be a coordinate obtained after offsetting the current second coordinate by a fifth predetermined offset value; determining a third projection coordinate of the pixel corresponding to the above-mentioned current second coordinate in the above-mentioned target view according to the depth information of the pixel corresponding to the above-mentioned current second coordinate in the above-mentioned reference view; and when a horizontal component of the above-mentioned third projection coordinate is less than or equal to the left boundary value in the above-mentioned first set of boundary values, and the horizontal component of the above-mentioned current second coordinate is greater than the left boundary range value corresponding to the above-mentioned current first pixel, updating the left boundary range value corresponding to the above-mentioned first pixel to be the horizontal component of the above-mentioned current second coordinate; and/or updating the right boundary range value corresponding to the above-mentioned second pixel comprises: updating the above-mentioned fourth coordinate to be a coordinate obtained after offsetting the above-mentioned current fourth coordinate by a sixth predetermined offset value; determining a fourth projection coordinate of the pixel corresponding to the above-mentioned current fourth coordinate in the above-mentioned target view according to the depth information of the pixel corresponding to the above-mentioned current fourth coordinate in the above-mentioned reference view; and when a horizontal component of the above-mentioned fourth projection coordinate is greater than or equal to the right boundary value in the above-mentioned first set of boundary values, and the horizontal component of the above-mentioned current fourth coordinate is greater than the right boundary range value corresponding to the above-mentioned second pixel, updating the right boundary range value corresponding to the above-mentioned second pixel to be the horizontal component of the above-mentioned current fourth coordinate.

Alternatively, the step of updating the left boundary range value corresponding to the above-mentioned first pixel is repeatedly executed a predetermined number of times, and/or the step of updating the left boundary range value corresponding to the above-mentioned second pixel is repeatedly executed a predetermined number of times.

Alternatively, the above-mentioned fifth predetermined offset value is determined by a difference value between the horizontal component of the coordinate of the above-mentioned first pixel and the horizontal component of the projection coordinate of the pixel corresponding to the above-mentioned second coordinate in the above-mentioned target view, and/or the above-mentioned sixth predetermined offset value is determined by a difference value between the horizontal component of the coordinate of the above-mentioned second pixel and the horizontal component of the projection coordinate of the pixel corresponding to the above-mentioned second coordinate in the above-mentioned target view.

Alternatively, determining a plurality of left boundary range values according to the location information of one or more pixels on the boundaries of the above-mentioned target rectangular block of pixels and the depth information of the above-mentioned reference view comprises: determining, in a parallel mode, the plurality of left boundary range values according to the location information of the one or more pixels on the boundaries of the above-mentioned target rectangular block of pixels and the depth information of the above-mentioned reference view; and/or determining a plurality of right boundary range values according to the location information of one or more pixels on the boundaries of the above-mentioned target rectangular block of pixels and the depth information of the above-mentioned reference view comprises: determining, in a parallel mode, the plurality of right boundary range values according to the location information of the one or more pixels on the boundaries of the above-mentioned target rectangular block of pixels and the depth information of the above-mentioned reference view.

Alternatively, updating the above-mentioned first set of boundary values according to the determined one or more boundary range values comprises: updating the left boundary value in the above-mentioned first set of boundary values to be a maximum value or a minimum value or a median value in the above-mentioned one or more left boundary range values; and/or updating the right boundary value in the above-mentioned first set of boundary values to be a maximum value or a minimum value or a median value in the above-mentioned one or more right boundary range values.

Alternatively, the above-mentioned method is applied to the 3D picture encoding and decoding techniques.

According to one aspect of the present invention, provided is a device for generating a predicted picture, comprising: a reference rectangular block of pixels determination module configured to determine a reference rectangular block of pixels according to parameter information, wherein the above-mentioned parameter information comprises a location of a target rectangular block of pixels and/or depth information of a reference view; a mapping module configured to map the above-mentioned reference rectangular block of pixels to a target view by means of the depth information of the above-mentioned reference view to obtain a projected rectangular block of pixels; and a predicted picture acquisition module configured to acquire a predicted picture block from the above-mentioned projected rectangular block of pixels.

Alternatively, the depth information of the above-mentioned reference view comprises at least one of the following: depth information of the above-mentioned reference view and camera parameters of the above-mentioned reference view.

Alternatively, a projection module can project the above-mentioned reference rectangular block of pixels to the target view using a forward projection.

Alternatively, the above-mentioned reference rectangular block of pixels determination module comprises: a first determination unit, configured to determine a first set of boundary values of the reference rectangular block of pixels according to the location of the target rectangular block of pixels when the above-mentioned parameter information comprises the location of the above-mentioned target rectangular block of pixels and the depth information of the above-mentioned reference view; an update unit, configured to update the above-mentioned first set of boundary values according to the depth information of the above-mentioned reference view, and take results obtained after the update as a second set of boundary values of the above-mentioned reference rectangular block of pixels, wherein the area of the reference rectangular block of pixels corresponding to the above-mentioned second set of boundary values is smaller than the area of the reference rectangular block of pixels corresponding to the above-mentioned first set of boundary values; and a second determination unit configured to determine the above-mentioned reference rectangular block of pixels in the reference view according to the above-mentioned second set of boundary values.

Alternatively, the above-mentioned first determination unit comprises: a left boundary value determination sub-unit configured to take a value which is obtained after subtracting a third predetermined offset value from the left boundary value of the above-mentioned target rectangular block of pixels as a left boundary value in the above-mentioned first set of boundary values of the above-mentioned reference rectangular block of pixels; a right boundary value determination sub-unit configured to take a value which is obtained after subtracting a fourth predetermined offset value from the right boundary value of the above-mentioned target rectangular block of pixels as a right boundary value in the above-mentioned first set of boundary values of the above-mentioned reference rectangular block of pixels; an upper boundary value determination sub-unit configured to take the upper boundary value of the above-mentioned target rectangular block of pixels as an upper boundary value of the above-mentioned first set of boundary values; and a lower boundary value determination sub-unit configured to take the lower boundary value of the above-mentioned target rectangular block of pixels as a lower boundary value of the above-mentioned first set of boundary values.

Alternatively, the above-mentioned update unit comprises: a boundary range value determination sub-unit configured to determine one or more boundary range values according to location information of one or more pixels on boundaries of the above-mentioned target rectangular block of pixels and the depth information of the above-mentioned reference view, wherein the above-mentioned boundary range values comprise left boundary range values and/or right boundary range values; and an update sub-unit configured to update the above-mentioned first set of boundary values according to the determined one or more boundary range values.

Alternatively, the above-mentioned boundary range value determination sub-unit is further configured to determine one or more left boundary range values in the following way: selecting one pixel on the left boundary of the above-mentioned target rectangular block of pixels as a first pixel; taking the left boundary value in the above-mentioned first set of boundary values as the left boundary range value corresponding to the first pixel; taking a first coordinate obtained after offsetting the coordinate of the above-mentioned first pixel by one default disparity as a second coordinate in the above-mentioned reference view; determining a first projection coordinate of a pixel corresponding to the above-mentioned second coordinate in the above-mentioned target view according to depth information of a pixel corresponding to the above-mentioned second coordinate in the above-mentioned reference view; and when a horizontal component of the above-mentioned first projection coordinate is less than or equal to the left boundary value in the above-mentioned first set of boundary values, updating the left boundary range value corresponding to the above-mentioned first pixel to be a horizontal component of the above-mentioned second coordinate; and/or the above-mentioned boundary range value determination sub-unit is further configured to determine one or more right boundary range values in the following way: selecting one pixel on the right boundary of the above-mentioned target rectangular block of pixels as a second pixel; taking the right boundary value in the above-mentioned first set of boundary values as the right boundary range value corresponding to the above-mentioned second pixel; taking a third coordinate obtained after offsetting the coordinate of the above-mentioned second pixel by one default disparity as a fourth coordinate in the above-mentioned reference view; determining a second projection coordinate of a pixel corresponding to the above-mentioned fourth coordinate in the above-mentioned target view according to depth information of a pixel corresponding to the above-mentioned fourth coordinate in the above-mentioned reference view; and when a horizontal component of the above-mentioned second projection coordinate is greater than or equal to the right boundary value in the above-mentioned first set of boundary values, updating the right boundary range value corresponding to the above-mentioned second pixel to be a horizontal component of the above-mentioned fourth coordinate.

In the embodiments of the present invention, provided is a new method for generating a predicted picture. When a reference rectangular block of pixels is generated, only the location of a target rectangular block of pixels and/or depth information of a reference view and/or camera parameters of a target view need to be used, without needing to determine the reference rectangular block of pixels by means of a depth picture of the target view; and during forward projection, the determination is made by means of the depth information of the reference view, without needing to know the depth picture of the target view in the entire process. By means of the above-mentioned method, the technical problem that the dependence on data is relatively large caused by the reason that a depth picture of a target view and a depth picture of a reference view need to be used at the same time during the process of generating the predicted picture in the prior art is solved, and the technical effects of reducing the dependence on data and improving the encoding and decoding efficiency are achieved.

BRIEF DESCRIPTION OF THE DRAWINGS

Drawings, provided for further understanding of the present invention and forming a part of the specification, are used to explain the present invention together with embodiments of the present invention rather than to limit the present invention. In the drawings.

DETAILED DESCRIPTION OF THE EMBODIMENTS

The present invention is described below with reference to the accompanying drawings and embodiments in detail. Note that, the embodiments of the present invention and the features of the embodiments can be combined with each other if there is no conflict.

Figure 1:
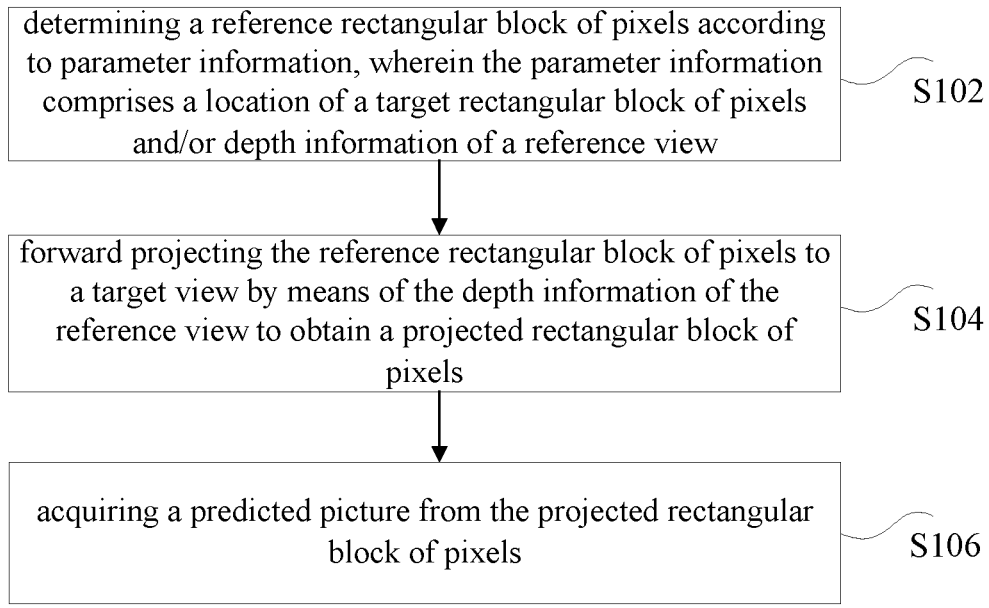
FIG. 1 is an alternative flow chart of a method for generating a predicted picture according to the embodiments of the present invention.

In the embodiments of the present invention, provided is an alternative method for generating a predicted picture, and as shown in FIG. 1, the method comprises the following steps:

step S102: determining a reference rectangular block of pixels according to parameter information, wherein the parameter information comprises a location of a target rectangular block of pixels and/or depth information of a reference view;

step S104: forward projecting the reference rectangular block of pixels to a target view by means of the depth information of the reference view to obtain a projected rectangular block of pixels; and step S106: acquiring a predicted picture from the projected rectangular block of pixels.

In the above-mentioned alternative embodiment, provided is a new method for generating a predicted picture. When a reference rectangular block of pixels is generated, only the location of a target rectangular block of pixels and/or depth information of a reference view and/or camera parameters of a target view need to be used, without needing to determine the reference rectangular block of pixels by means of a depth picture of the target view; and during the forward projection, the determination is made by means of the depth information of the reference view, without needing to know the depth picture of the target view in the entire process. By means of the above-mentioned method, the technical problem that the dependence on data is relatively large caused by the reason that a depth picture of a target view and a depth picture of a reference view need to be used at the same time during the process of generating the predicted picture in the prior art is solved, and the technical effects of reducing the dependence on data and improving the encoding and decoding efficiency are achieved.

In the above-mentioned alternative embodiment, the depth information of the reference view may comprise, but is not limited to, at least one of the following: depth information of the reference view and camera parameters of the reference view.

In the present embodiment, provided is a simple method for determining a reference rectangular block of pixels. In the method, one reference rectangular block of pixels can be determined only in accordance with predetermined offset values and boundary values of a target rectangular block of pixels. In one alternative embodiment, when the parameter information comprises a location of the target rectangular block of pixels, determining the reference rectangular block of pixels according to the parameter information comprises the following steps:

step S1: taking a value, which is obtained after subtracting a first predetermined offset value from a left boundary value of the target rectangular block of pixels, as a left boundary value of the reference rectangular block of pixels;

step S2: taking a value, which is obtained after subtracting a second predetermined offset value from a right boundary value of the target rectangular block of pixels, as a right boundary value of the reference rectangular block of pixels;

step S3: taking an upper boundary value of the target rectangular block of pixels as an upper boundary value of the reference rectangular block of pixels;

step S4: taking a lower boundary value of the target rectangular block of pixels as a lower boundary value of the reference rectangular block of pixels; and step S5: taking the determined left boundary value, right boundary value, upper boundary value and lower boundary value of the reference rectangular block of pixels as boundary information of the reference rectangular block of pixels, so as to determine the reference rectangular block of pixels in the reference view.

The above-mentioned first predetermined offset value and second predetermined offset value are respectively one preset numerical value that is not zero, which for example can be 100, 200, 150.5, −100, −200, etc.

That is, the boundary values corresponding to the reference rectangular block of pixels can be determined only according to the boundary values of the target rectangular block of pixels, and thus the implementation is simple and the encoding and decoding efficiency can be improved.

Figure 2:
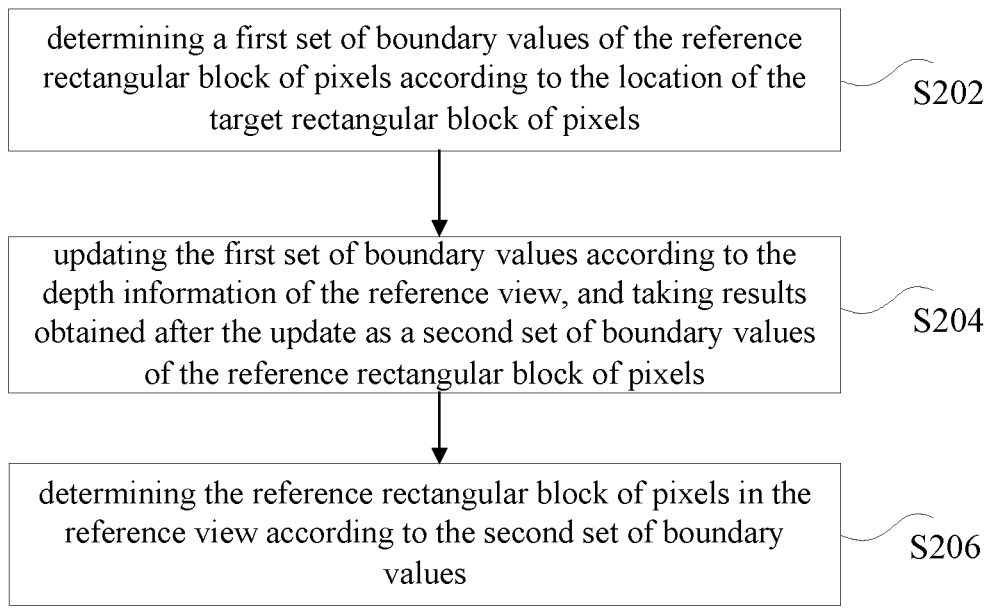
FIG. 2 is another alternative flow chart of a method for generating a predicted picture according to the embodiments of the present invention.

In order to make the predicted picture more accurate, a method for accurately determine a reference rectangular block of pixels is further provided in the embodiments of the present invention, in which method depth information of the reference view needs to be used, and as shown in FIG. 2, the specific implementation method comprises:

step S202: determining a first set of boundary values of the reference rectangular block of pixels according to a location of the target rectangular block of pixels;

step S204: updating the first set of boundary values according to the depth information of the reference view, and taking results obtained after the update as a second set of boundary values of the reference rectangular block of pixels, wherein the area of the reference rectangular block of pixels corresponding to the second set of boundary values is smaller than the area of the reference rectangular block of pixels corresponding to the first set of boundary values; and step S206: determining the reference rectangular block of pixels in the reference view according to the second set of boundary values.

That is, the determined reference rectangular block of pixels is adjusted by means of the depth information of the reference view, so that the determined picture through encoding/decoding is more accurate.

In this process, the above-mentioned reference rectangular block of pixels determined in the simplest way can be used as a basis for adjustment, that is, the most basic reference rectangular block of pixels is determined in the above-mentioned way, and boundary values of the most basic reference rectangular block of pixels are taken as the first set of boundary values.

However, at this point, the first predetermined offset value can be a maximum disparity value between the reference view and the target view; and the second predetermined offset value can be a minimum disparity value between the reference view and the target view.

The first set of boundary values can be adjusted by means of pixels on the left and right boundaries of the target rectangular block of pixels. In one alternative embodiment, updating the first set of boundary values according to the depth information of the reference view comprises: determining one or more boundary range values according to location information of one or more pixels on boundaries of the target rectangular block of pixels and the depth information of the reference view, wherein the boundary range values comprise left boundary range values and/or right boundary range values; and updating the first set of boundary values according to the determined one or more boundary range values. That is, a plurality of points on the boundaries of the target rectangular block of pixels can be selected, then one boundary range value is determined for each selected point on the boundaries, and boundary range values which are used to update the first set of boundary values are selected therefrom, for example, one boundary range value can be selected from those corresponding to left boundary pixels to update the left boundary value in the first set of boundary values, and one boundary range value can be selected from those corresponding to right boundary pixels to update the right boundary value in the first set of boundary values, so that the update of the first set of boundary values is achieved.

In one alternative embodiment, updating the first set of boundary values according to the determined one or more boundary range values comprises: selecting one from the one or more left boundary range values as the left boundary value in the first set of boundary values, wherein the left boundary range value is a boundary range value corresponding to pixels on a left boundary of the target rectangular block of pixels; and/or selecting one from the one or more right boundary range values as the right boundary value in the first set of boundary values, wherein the right boundary range value is a boundary range value corresponding to pixels on a right boundary of the target rectangular block of pixels.

Figure 3:
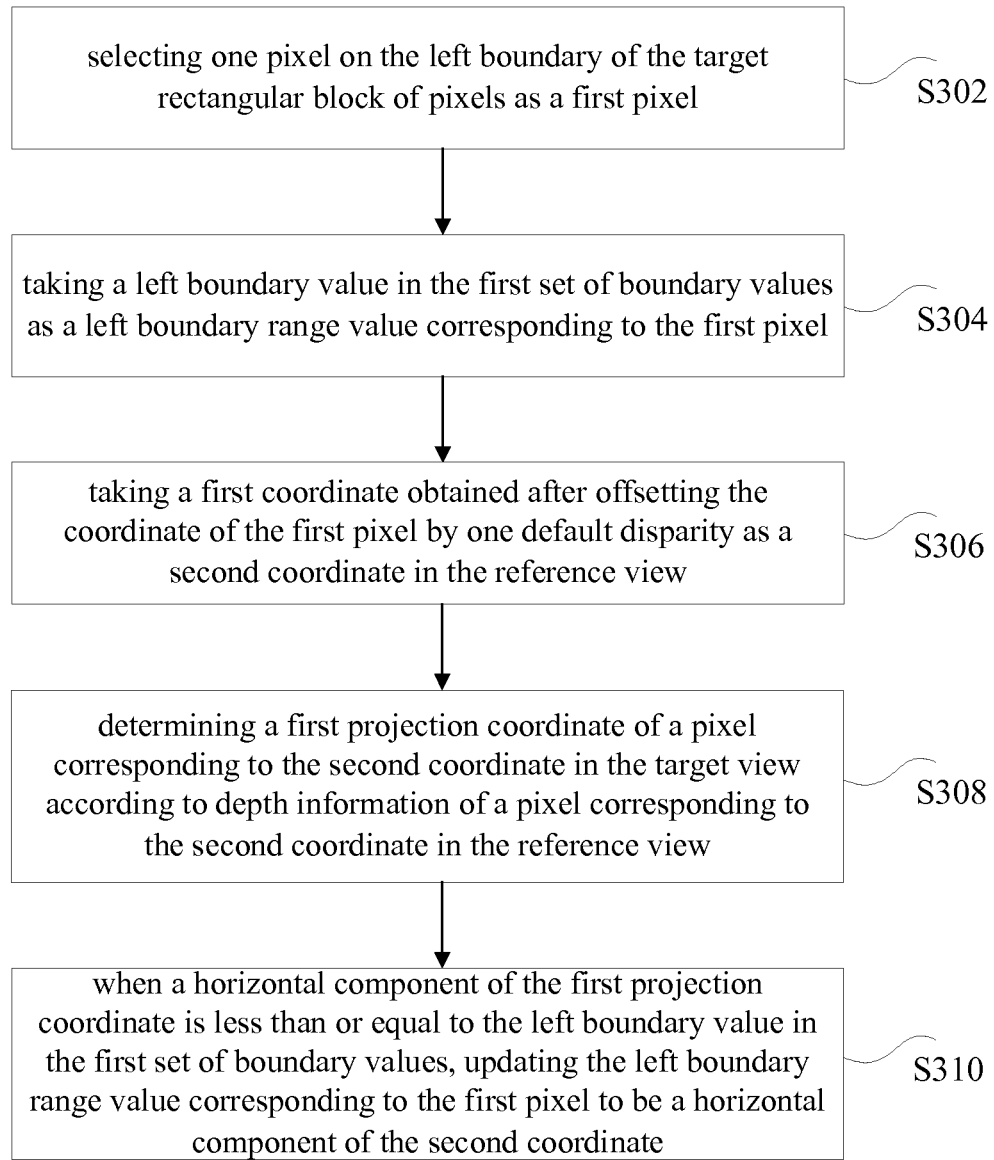
FIG. 3 is still another alternative flow chart of a method for generating a predicted picture according to the embodiments of the present invention.

In the embodiments of the present invention, further provided is a method of how to determine boundary range values corresponding to pixels on a boundary; illustration is given through an example of a left boundary, as shown in FIG. 3, the step of determining one or more left boundary range values according to location information of one or more pixels on the boundaries of a target rectangular block of pixels and depth information of a reference view comprises:

step S302: selecting one pixel on the left boundary of the target rectangular block of pixels as a first pixel;

step S304: taking a left boundary value in a first set of boundary values as a left boundary range value corresponding to the first pixel;

step S306: taking a first coordinate obtained after offsetting the coordinate of the first pixel by one default disparity as a second coordinate in the reference view;

step S308: determining a first projection coordinate of a pixel corresponding to the second coordinate in the target view according to depth information of a pixel corresponding to the second coordinate in the reference view; and step S310: when a horizontal component of the first projection coordinate is less than or equal to the left boundary value in the first set of boundary values, updating the left boundary range value corresponding to the first pixel to be a horizontal component of the second coordinate. The above-mentioned default disparity can be a disparity value corresponding to one depth value between the reference view and the target view, which for example can be a disparity value corresponding to a depth value 128.

Figure 4:
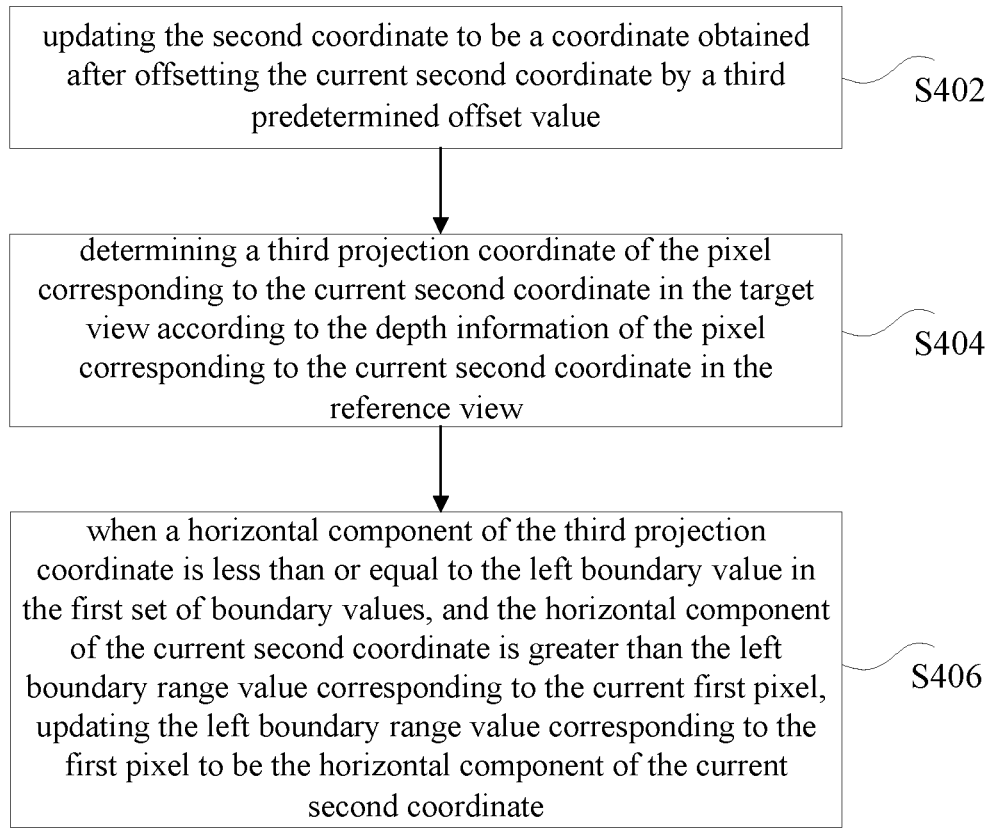
FIG. 4 is still another alternative flow chart of a method for generating a predicted picture according to the embodiments of the present invention.

In order to further update the above-mentioned boundary range values, no matter whether the update of the boundary range values in the above-mentioned steps is successful or not, the following operation can be repeatedly executed so as to update the boundary range values, so that the reference rectangular block of pixels which is finally determined by the boundary range values corresponding to the pixels is as small as possible, thereby improving the accuracy rating of picture encoding/decoding. As shown in FIG. 4, the operation comprises the following steps:

step S402: updating the second coordinate to be a coordinate obtained after offsetting the current second coordinate by a third predetermined offset value, wherein the third predetermined offset value can be determined by a difference value between the horizontal component of the coordinate of the first pixel and the horizontal component of the projection coordinate of the pixel corresponding to the second coordinate in the target view;

step S404: determining a third projection coordinate of a pixel corresponding to the current second coordinate in the target view according to the depth information of the pixel corresponding to the current second coordinate in the reference view; and step S406: when a horizontal component of the third projection coordinate is less than or equal to the left boundary value in the first set of boundary values, and the horizontal component of the current second coordinate is greater than the left boundary range value corresponding to the current first pixel, updating the left boundary range value corresponding to the first pixel to be the horizontal component of the current second coordinate.

The above-mentioned steps S402 to S406 can be repeatedly executed, that is, the steps of updating the left boundary range value corresponding to the first pixel can be repeatedly executed a predetermined number of times, so that the boundary range value corresponding to the pixel is more accurate.

If the boundary range values of pixels on a plurality of boundaries need to be acquired at the same time, a serial mode or a parallel mode can be used. Accordingly, only one processing module needs to be provided if the serial mode is used; and accordingly, if the parallel mode is used, a plurality of modules for generating boundary range values need to coexist in the system, and then a plurality of boundary pixels can be processed at the same time.

Updating the first set of boundary values according to the determined one or more boundary range values as mentioned above may comprise:

updating the left boundary value in the first set of boundary values to be a maximum value or a minimum value or a most median numerical value of the one or more left boundary range values.

The description above is mainly based on the left boundary. Alternatively, the method for determining range values corresponding to pixels on a right boundary is the same as the above-mentioned method for determining range values corresponding to pixels on a left boundary, and the details are not described here again.

The methods for acquiring a predicted picture involved in the above-mentioned alternative embodiments can be applied to the 3D picture encoding/decoding techniques.

Figure 5:
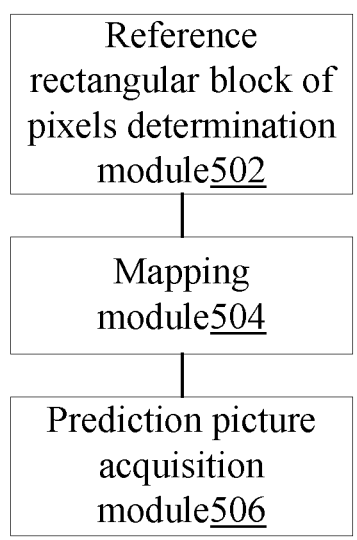
FIG. 5 is an alternative structure block diagram of a device for generating a predicted picture according to the embodiments of the present invention.

In the present embodiment, further provided is a device for generating a predicted picture, and the device is used for implementing the above-mentioned embodiments and alternative embodiments, which have been described and need not be described redundantly. As used below, terms "unit" or "module" is a combination of software and/or hardware which can implement a predetermined function. Although the device described in the following embodiments is alternatively implemented with software, implementations using hardware or combinations of software and hardware are also possible and can be conceived. FIG. 5 is a alternative structure block diagram of a device for generating a predicted picture according to the embodiments of the present invention. As shown in FIG. 5, the device comprises: a reference rectangular block of pixels determination module 502, a projection module 504 and a predicted picture acquisition module 506. The structure is described below.

1) the reference rectangular block of pixels determination module 502 is configured to determine a reference rectangular block of pixels according to parameter information, wherein the parameter information comprises a location of a target rectangular block of pixels and/or depth information of a reference view;

2) the mapping module 504 is configured to forward project the reference rectangular block of pixels to a target view by means of the depth information of the reference view to obtain a projected rectangular block of pixels; and 3) the predicted picture acquisition module 506 is configured to acquire a predicted picture from the projected rectangular block of pixels.

Figure 6:
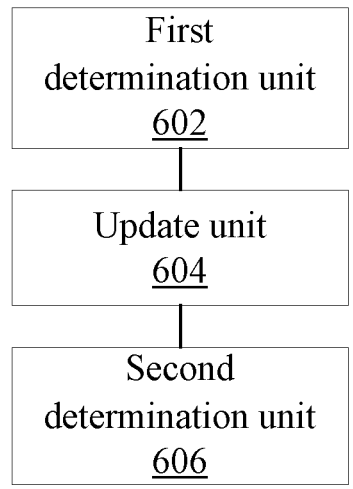
FIG. 6 is another alternative structure block diagram of a device for generating a predicted picture according to the embodiments of the present invention.

In one alternative embodiment, as shown in FIG. 6, the reference rectangular block of pixels determination module comprises: a first determination unit 602, configured to determine a first set of boundary values of the reference rectangular block of pixels according to the location of the target rectangular block of pixels when the parameter information comprises the location of the target rectangular block of pixels and the depth information of the reference view; an update unit 604, configured to update the first set of boundary values according to the depth information of the reference view, and taking results obtained after the update as a second set of boundary values of the reference rectangular block of pixels, wherein the area of the reference rectangular block of pixels corresponding to the second set of boundary values is smaller than the area of the reference rectangular block of pixels corresponding to the first set of boundary values; and a second determination unit 606, configured to determine the reference rectangular block of pixels in the reference view according to the second set of boundary values.

In one alternative embodiment, the first determination unit comprises: a left boundary value determination sub-unit, configured to take a value which is obtained after subtracting a third predetermined offset value from the left boundary value of the target rectangular block of pixels as a left boundary value in the first set of boundary values of the reference rectangular block of pixels; a right boundary value determination sub-unit, configured to take a value which is obtained after subtracting a fourth predetermined offset value from the right boundary value of the target rectangular block of pixels as a right boundary value in the first set of boundary values of the reference rectangular block of pixels; an upper boundary value determination sub-unit, configured to take the upper boundary value of the target rectangular block of pixels as an upper boundary value of the first set of boundary values; and a lower boundary value determination sub-unit, configured to take the lower boundary value of the target rectangular block of pixels as a lower boundary value of the first set of boundary values.

In one alternative embodiment, the update unit comprises: a boundary range value determination sub-unit, configured to determine one or more boundary range values according to location information of one or more pixels on boundaries of the target rectangular block of pixels and the depth information of the reference view, wherein the boundary range values comprise left boundary range values and/or right boundary range values; and an update sub-unit, configured to update the first set of boundary values according to the determined one or more boundary range values.

In order to make the objectives, technical solutions and advantages of the present invention more apparent, the present invention will be further described in detail in combination with several specific embodiments below. However, it is noted that these alternative embodiments are only intended to better describe the present invention, rather than to limit the present invention.

Firstly, several nouns that are possibly used in the following embodiments are explained.

1) Calculating a projection coordinate according to a projection relationship: for example, there is now a pixel pA in a reference view and a depth value corresponding to the pixel; in order to calculate a projection coordinate ppA' of the pA in another target view, the projection coordinate projected to the target view can be obtained through calculation according to information such as the location of the pA in the space by utilizing location information of the pA in the reference view, depth information corresponding to the pA and camera parameters of the two views (the reference view and the target view). The value of the projection coordinate is generally qualified, that is, the value of the projection coordinate can generally be expressed as integral multiples of 1/t.

2) Depth value: a depth value corresponding to a pixel may represent the distance between that point on an object in a physical space corresponding to the pixel and a camera, and may also represent a converted intermediate parameter, such as a disparity value and a depth level of the pixel with respect to one view, etc.

The disparity value (or disparity) can generally be obtained through conversion using the following formula:

$$d = \frac{\frac{1}{z} - \frac{1}{z_{far}}}{\frac{1}{z_{near}} - \frac{1}{z_{far}}} \times 2^{bitdepth} \quad disp = \frac{f(t_v - t_r)}{z} + (c_v - c_r)$$

where disp represents the disparity, f represents a focal distance of the camera, z represents an actual distance between a point corresponding to the pixel in the picture and the camera, $(t_v-t_r)$ represents a translation relationship between two cameras (views), and $(c_v-c_r)$ represents a difference value between the locations of reference points of the two cameras (views).

The depth level can generally be obtained through conversion using the following formula:

$$d = \frac{\frac{1}{z} - \frac{1}{z_{far}}}{\frac{1}{z_{near}} - \frac{1}{z_{far}}} \times 2^{bitdepth}$$

where d represents the depth level, z represents an actual distance between a point corresponding to the pixel in the picture and the camera, $z_{near}$ and $z_{far}$ respectively represents the maximum and minimum values of z in the current picture, and bitdepth represents a data-bit width of the depth level.

For the two views (the reference view and the target view), the maximum value MaxDisparity and the minimum value MinDisparity of the disparity value are: a numerical range of the depth level of 0-255 is taken as an example, MaxDisparity is the maximum value of all the disparity values corresponding to the depth levels of 0-255, and MinDisparity is the minimum value of all the disparity values corresponding to the depth levels of 0-255.

2) Pixel: one pixel contains information such as its pixel value and a coordinate corresponding thereto.

3) Rectangular block of pixels: the coordinate value of a pixel at an upper left corner of an M*N sized rectangular block of pixels is (XTL, YTL), then the coordinate values of all the pixels in the rectangular block of pixels can be represented as (XTL+i, YTL+j), with 0≤i<M and 0≤j<N.

The location of a rectangular block of pixels can be determined by the locations of the boundaries of four sides, i.e. upper, lower, left and right sides, of the rectangular block of pixels. The upper boundary value of the rectangular block of pixels is a coordinate value in the vertical direction of a pixel at an uppermost side in the block, the lower boundary value of the rectangular block of pixels is a coordinate value in the vertical direction of a pixel at a lowermost side in the block, the left boundary value of the rectangular block of pixels is a coordinate value in the horizontal direction of a pixel at a leftmost side in the block, and the right boundary value of the rectangular block of pixels is a coordinate value in the horizontal direction of a pixel at a rightmost side in the block.

The description is provided below in combination with several specific embodiments:

Embodiment 1

In the present embodiment, provided is a block-based method for generating a predicted picture: determining a reference rectangular block of pixels Br in a reference view by means of the location of a target rectangular block of pixels Bt in a target view and depth information in the reference view, forward projecting Br to a target view by utilizing the depth information of the reference view, and acquiring a predicted picture from a projected rectangular block of pixels Bs which is obtained through projection.

In the above, at least one pixel which is projected to the target view in Br falls within Bt.

The left boundary value of Br, BrLeft, is assigned to be a value obtained after offsetting the left boundary of Bt, BtLeft, by ShiftValueLeft, i.e. BrLeft=BtLeft−ShiftValueLeft; the right boundary of Br, BrRight, is assigned to be a location obtained after offsetting the right boundary of Bt, BtRight, by ShiftValueRight, i.e. BrRight=BtRight−ShiftValueRight; and the upper boundary value of Br is assigned to be the upper boundary value of Bt, and the lower boundary value of Br is assigned to be the lower boundary value of Bt.

After the boundary ranges of Br are determined, Br in the reference view is forward projected to the target view by utilizing the depth information of the reference view, and a predicted picture is acquired from the projected rectangular block of pixels Bs which is obtained through projection, wherein the predicted picture is smaller than or equal to Bs, and when the predicted picture is smaller than Bs, pixels at corresponding locations are intercepted from Bs according to the location of the predicted picture to form the predicted picture.

Alternatively, the above-mentioned variable ShiftValueLeft can be a value such as 100, 200, 150.5, −100 and −200; and the above-mentioned variable ShiftValueRight can also be a value such as 100, 200, 150.5, −100 and −200.

Embodiment 2

In the present embodiment, provided is a block-based method for generating a predicted picture: determining a reference rectangular block of pixels Br in a reference view by means of the location of a target rectangular block of pixels Bt in a target view and depth information in the reference view, forward projecting Br to a target view by utilizing the depth information of the reference view, and acquiring a predicted picture from a projected rectangular block of pixels Bs which is obtained through projection.

In the above, at least one pixel which is projected to the target view in Br falls within Bt.

In the above, the left boundary value of Br, BrLeft, is assigned to be a value obtained after offsetting the left boundary value of Bt by MaxDisparity; the right boundary value of Br, BrRight, is a value obtained after offsetting the right boundary value of Bt by MinDisparity; and the upper boundary value of Br is assigned to be the upper boundary value of Bt, and the lower boundary value of Br is assigned to be the lower boundary value of Bt. Alternatively, MaxDisparity and MinDisparity are respectively the maximum disparity value and the minimum disparity value between the reference view and the target view.

The left boundary value of Br, BrLeft, is assigned to be a value obtained after offsetting the left boundary of Bt, BtLeft, by MaxDisparity, i.e. BrLeft=BtLeft−MaxDisparity; the right boundary of Br, BrRight, is assigned to be a location obtained after offsetting the right boundary of Bt, BtRight, by MinDisparity, i.e. BrRight=BtRight−MinDisparity; and the upper boundary value of Br is assigned to be the upper boundary value of Bt, and the lower boundary value of Br is assigned to be the lower boundary value of Bt. MaxDisparity and MinDisparity are respectively the maximum disparity value and the minimum disparity value between the reference view and the target view.

After the boundary ranges of Br are determined, Br in the reference view is forward projected to the target view by utilizing the depth information of the reference view, and a predicted picture is acquired from the projected rectangular block of pixels Bs which is obtained through projection, wherein the predicted picture is smaller than or equal to Bs, and when the predicted picture is smaller than Bs, pixels at corresponding locations are intercepted from Bs according to the location of the predicted picture to form the predicted picture.

Embodiment 3

In the present embodiment, provided is a block-based method for generating a predicted picture: determining a reference rectangular block of pixels Br in a reference view by means of the location of a target rectangular block of pixels Bt in a target view and depth information in the reference view, forward projecting Br to a target view by utilizing the depth information of the reference view, and acquiring a predicted picture from a projected rectangular block of pixels Bs which is obtained through projection.

The left boundary value of Br, BrLeft, is assigned to be a value obtained after offsetting the left boundary of Bt, BtLeft, by MaxDisparity, i.e. BrLeft=BtLeft−MaxDisparity; the right boundary of Br, BrRight, is assigned to be a location obtained after offsetting the right boundary of Bt, BtRight, by MinDisparity, i.e. BrRight=BtRight−MinDisparity; and the upper boundary value of Br is assigned to be the upper boundary value of Bt, and the lower boundary value of Br is assigned to be the lower boundary value of Bt. Alternatively, MaxDisparity and MinDisparity are respectively the maximum disparity value and the minimum disparity value between the reference view and the target view.

In the process of determining a reference rectangular block of pixels Br in a reference view by means of the location of a target rectangular block of pixels Bt in a target view and depth information in the reference view, the following operations are performed on at least one pixel PBt of the pixels on the left and right boundaries of the target rectangular block of pixels Bt:

1) Initialization: if PBt is located on the left boundary of Bt, DirSign is assigned to be a negative number, for example, DirSign=−1, and Bound is assigned to be the left boundary value of the reference rectangular block of pixels Br, BrLeft, i.e. Bound=BrLeft; otherwise, DirSign is assigned to be a positive number, for example, DirSign=1, and Bound is assigned to be the right boundary value of Br, BrRight, i.e. Bound=BrRight.

2) Initialization of Cr: the coordinate Cr is equal to a coordinate obtained after offsetting the coordinate of PBt in the horizontal direction by a default disparity, DefaultDisp, wherein the coordinate value of PBt is denoted as (XPBt, YPBt) and the coordinate value of Cr is denoted as (XCr, YCr), then XCr=XPBt−DefaultDisp, YCr=YPBt, where the value of DefaultDisp can be a disparity value corresponding to a depth value of 128 or other depth values between the reference view and the target view.

Update of Bound: a projection coordinate Ct of PCr in the target view is calculated according to a projection relationship by combining a pixel PCr located at Cr with depth information corresponding to PCr, that is, the coordinate value of Ct is (XCt, YCt), and if the product of a horizontal coordinate difference value between Ct and PBt and DirSign, (XCt−XPBt)*DirSign≥0, then Bound is updated to be the horizontal coordinate value of Cr, i.e. Bound=XCr. 3) The following steps are repeated a non-negative integer number of times, that is, the following steps may not be executed and may also be repeatedly executed a predetermined number of times:

the update of Cr: Cr is updated to be a coordinate obtained after offsetting Cr in the horizontal direction by ShiftDisp, i.e. (XCr, YCr)=(XCr−ShiftDisp, YCr), wherein the value of ShiftDisp is determined by a horizontal coordinate difference value between Ct and PBt, for example, ShiftDisp=a*(XCt−XPBt)+b, where both a and b are real numbers, the value of a may be 1, −1, 0, 1.5, −1.5, etc.; and the value of b can be 1, −1, 0, etc.;

the update of Bound: a projection coordinate Ct of PCr in the target view is calculated according to a projection relationship by combining a pixel PCr located at Cr with depth information corresponding to PCr, i.e. the coordinate value of Ct is (XCt, YCt), and if the product of a horizontal coordinate difference value between Ct and PBt and DirSign, (XCt−XPBt)*DirSign≥0, then Bound is updated to be the horizontal coordinate value of Cr, i.e. Bound=XCr; the update of the boundaries of of Br: after it is judged that there is a pixel, which the above-mentioned operations are executed for, on the left boundary of Bt, one Bound value is selected from those corresponding to all the pixels, which the above-mentioned operations are executed for, to update BrLeft; alternatively, N Bound values obtained through calculating pixels on the left boundary of Bt can be denoted as Bound(i), with i=1, 2, . . . , N, then BrLeft=Maximum(Bound(1), Bound(2), . . . , Bound(N)), or BrLeft=Minimum(Bound(1), Bound(2), . . . , Bound(N)), or BrLeft=Median(Bound(1), Bound(2), . . . , Bound(N));

if there is a pixel, which the above-mentioned operations are executed for, on the right boundary of Bt, one Bound value is selected from those corresponding to all the pixels, which the above-mentioned operations are executed for, to update BrRight; M Bound values obtained through calculating pixels on the right boundary of Bt can be denoted as Bound(j), with j=1, 2, . . . , M, then BrRight=Maximum(Bound(1), Bound(2), . . . , Bound(M)), or BrRight=Minimum(Bound(1), Bound(2), . . . , Bound(M)), or BrRight=Median(Bound(1), Bound(2), . . . , Bound(M));

where the return value of function Maximum(x1, x2, . . . , xK) is a maximum value of these numbers x1 to xK, the return value of Minimum(x1, x2, . . . , xK) is a minimum value of these numbers x1 to xK, and the return value of Median(x1, x2, . . . , xK) is a numerical value which is the most median of these numbers x1 to xK. BrLeft and BrRight are respectively the left boundary value and right boundary value of the reference rectangular block of pixels Br.

After the boundary ranges of Br are determined, Br in the reference view can be forward projected to the target view by utilizing the depth information of the reference view, and a predicted picture is acquired from the projected rectangular block of pixels Bs which is obtained through projection, wherein the predicted picture is smaller than or equal to Bs, and when the predicted picture is smaller than Bs, pixels at corresponding locations are intercepted from Bs according to the location of the predicted picture to form the predicted picture.

Embodiment 4

Figure 7:
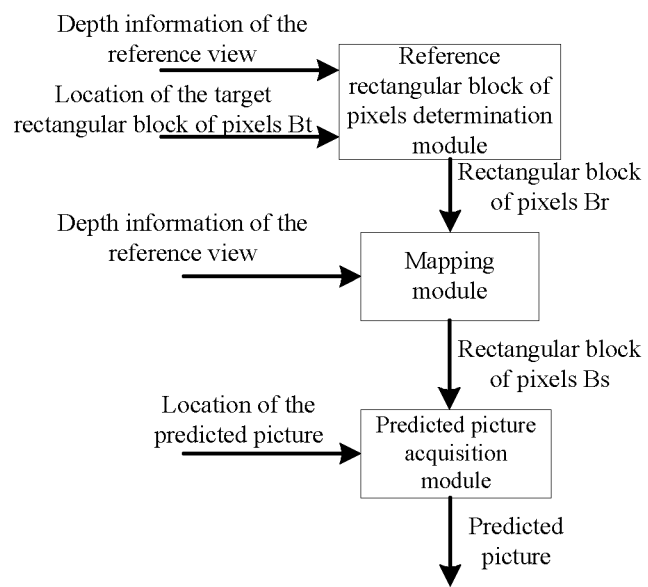
FIG. 7 is an alternative schematic diagram of a block-based device for generating a predicted picture according to the embodiments of the present invention.

In the present embodiment, provided is block-based device for generating a predicted picture, and as shown in FIG. 7, the device comprises a reference rectangular block of pixels determination module, a mapping module and a predicted picture acquisition module. These modules are described in detail below.

The reference rectangular block of pixels determination module, the input of which is the location of the target rectangular block of pixels Bt in the target view, and depth information in the reference view, is configured to determine the reference rectangular block of pixels Br in the reference view: the left boundary value of Br, BrLeft, is assigned to be a value obtained after offsetting the left boundary of Bt, BtLeft, by ShiftValueLeft, i.e. BrLeft=BtLeft−ShiftValueLeft; the right boundary of Br, BrRight, is assigned to be a location obtained after offsetting the right boundary of Bt, BtRight, by ShiftValueRight, i.e. BrRight=BtRight−ShiftValueRight; and the upper boundary value of Br is assigned to be the upper boundary value of Bt, and the lower boundary value of Br is assigned to be the lower boundary value of Bt; output Br to the mapping module.

Alternatively, the above-mentioned variable ShiftValueLeft can be a value such as 100, 200, 150.5, −100 and −200; and the above-mentioned variable ShiftValueRight can also be a value such as 100, 200, 150.5, −100 and −200.

The mapping module, the input of which is the depth information of the reference view and the reference rectangular block of pixels Br from the reference rectangular block of pixels determination module, is configure to forward project Br to the target view by utilizing the depth information of the reference view, so as to obtain the projected rectangular block of pixels Bs; and output Bs to the predicted picture acquisition module.

The predicted picture acquisition module, the input of which is the location of the predicted picture and the projected rectangular block of pixels Bs from the mapping module, is configured to acquire the predicted picture from Bs according to the location of the predicted picture, wherein the predicted picture is smaller than or equal to Bs, and when the predicted picture is smaller than Bs, pixels at corresponding locations are intercepted from Bs according to the location of the predicted picture to form the predicted picture; and output the predicted picture.

Embodiment 5

In the present embodiment, provided is block-based device for generating a predicted picture, wherein the device contains a reference rectangular block of pixels determination module, a mapping module and a predicted picture acquisition module:

The reference rectangular block of pixels determination module, the input of which is the location of the target rectangular block of pixels Bt in the target view and depth information in the reference view, is configured to determine the reference rectangular block of pixels Br in the reference view: the left boundary value of Br, BrLeft, is assigned to be a value obtained after offsetting the left boundary of Bt, BtLeft, by MaxDisparity, i.e. BrLeft=BtLeft−MaxDisparity; the right boundary of Br, BrRight, is assigned to be a location obtained after offsetting the right boundary of Bt, BtRight, by MinDisparity, i.e. BrRight=BtRight−MinDisparity; and the upper boundary value of Br is assigned to be the upper boundary value of Bt, and the lower boundary value of Br is assigned to be the lower boundary value of Bt. MaxDisparity and MinDisparity are respectively the maximum disparity value and the minimum disparity value between the reference view and the target view; output Br to the mapping module.

The mapping module, the input of which is the depth information of the reference view and the reference rectangular block of pixels Br from the reference rectangular block of pixels determination module, is configured to forward project Br to the target view by utilizing the depth information of the reference view, so as to obtain the projected rectangular block of pixels Bs; and output Bs to the predicted picture acquisition module.

The predicted picture acquisition module, the input of which is the location of the predicted picture and the projected rectangular block of pixels Bs from the mapping module, is configured to acquire the predicted picture from Bs according to the location of the predicted picture, wherein the predicted picture is smaller than or equal to Bs, and when the predicted picture is smaller than Bs, pixels at corresponding locations are intercepted from Bs according to the location of the predicted picture to form the predicted picture; and output the predicted picture.

Embodiment 6

Figure 8:
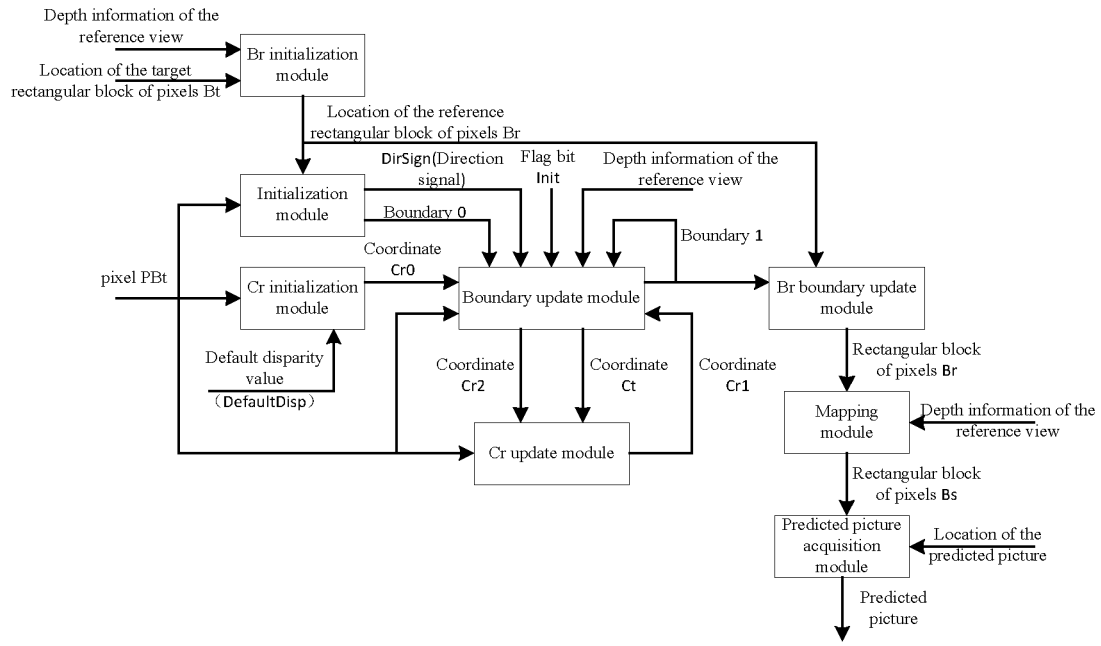
FIG. 8 is an alternative schematic diagram of a block-based device for generating a predicted picture according to embodiment 6 of the present invention.

In the present embodiment, provided is block-based device for generating a predicted picture, and as shown in FIG. 8, the device contains a Br initialization module, an initialization module, a Cr initialization module, a Bound update module, a Cr update module, a Br boundary update module, a mapping module and a predicted picture acquisition module.

The Br initialization module, the input of which is the location of the target rectangular block of pixels Bt in the target view and depth information in the reference view, is configured to determine the reference rectangular block of pixels Br in the reference view: the left boundary value of Br, BrLeft, is assigned to be a value obtained after offsetting the left boundary of Bt, BtLeft, by MaxDisparity, i.e. BrLeft=BtLeft−MaxDisparity; the right boundary of Br, BrRight, is assigned to be a location obtained after offsetting the right boundary of Bt, BtRight, by MinDisparity, i.e. BrRight=BtRight−MinDisparity; and the upper boundary value of Br is assigned to be the upper boundary value of Bt, and the lower boundary value of Br is assigned to be the lower boundary value of Bt; MaxDisparity and MinDisparity are respectively the maximum disparity value and the minimum disparity value between the reference view and the target view; output the location of Br to the initialization module and the Br boundary update module.

For the initialization module, the input thereof is the pixel PBt and the location of the reference rectangular block of pixels Br from the Br initialization module. If PBt is located on the left boundary of Bt, DirSign is assigned to be a negative number, for example, DirSign=−1, and Bound0 is assigned to be the left boundary value, BrLeft, of the reference rectangular block of pixels Br, i.e. Bound0=BrLeft; otherwise, DirSign is assigned to be a positive number, for example, DirSign=1, and Bound0 is assigned to be the right boundary value, BrRight, of Br, i.e. Bound0=BrRight. The initialization module is configured to output Bound0 and DirSign to the Bound update module.

For the Cr initialization module, the input thereof is the pixel PBt and the default disparity value DefaultDisp, wherein coordinate Cr0 is equal to a coordinate obtained after offsetting the coordinate of PBt in the horizontal direction by DefaultDisp, the coordinate value of PBt is denoted as (XPBt, YPBt) and the coordinate value of Cr0 is denoted as (XCr0, YCr0), then XCr0=XPBt−DefaultDisp, YCr0=YPBt, the value of DefaultDisp can be a disparity value corresponding to a depth value of 128 or other depth values between the reference view and the target view. The Cr initialization module is configured to output Cr0 to the Bound update module.

For the Bound update module, the input thereof is depth information of the reference view, the pixel PBt, a flag bit Init, the coordinate Cr0 from the Cr initialization module, DirSign and Bound0 from the initialization module, Bound1 from the Bound update module and the coordinate Cr1 from the Cr update module, wherein the coordinate value of Cr is (XCr, YCr) and the coordinate value of Cr1 is (XCr1, YCr1); when Init is equal to 0, Bound is assigned to be Bound0 and Cr is assigned to be Cr0, i.e. Bound=Bound0, XCr=XCr0, YCr=YCr0; otherwise, Bound is assigned to be Bound1 and Cr is assigned to be Cr1, i.e. Bound=Bound1, XCr=XCr1, YCr=YCr1. Init represents whether the present module has received data from the initialization module and the Cr initialization module, if not received, Init is equal to 0, otherwise, Init is equal to 1; the Bound update module is configured to calculate a projection coordinate Ct of PCr in the target view according to a projection relationship by combining a pixel PCr located at Cr with depth information corresponding to PCr, i.e. the coordinate value of Ct is (XCt, YCt), and if the product of a horizontal coordinate difference value between Ct and PBt and DirSign, (XCt−XPBt)*DirSign≥0, and Init=1, the product of a difference value between a horizontal coordinate value of Cr and Bound and DirSign also satisfies (XCr−Bound)*DirSign<0, then the Bound update module is configured to update Bound to be the horizontal coordinate value of Cr, i.e. Bound=XCr; the Bound update module is configured to assign Bound1 to be Bound (i.e. Bound1=Bound) and output the assigned Bound1 to the Bound update module and the Br boundary update module, and assign Cr2 to be Cr (the coordinate value of Cr2 is (XCr2, YCr2)=(XCr, YCr)) and output assigned Cr2 to the Cr update module, and output Ct to the Cr update module.

The Cr update module, the input of which is the pixel PBt, the coordinate Cr2 and coordinate Ct from the Bound update module, is configured to update Cr1 to be a coordinate obtained after offsetting Cr2 in the horizontal direction by ShiftDisp, i.e. (XCr1, YCr1)=(XCr2−ShiftDisp, YCr2), wherein the value of ShiftDisp is determined by a horizontal coordinate difference value between Ct and PBt, for example, ShiftDisp=a*(XCt−XPBt)+b, where both a and b are real numbers, the value of a may be 1, −1, 0, 1.5, −1.5, etc.; and the value of b can be 1, −1, 0, etc.; output Cr1 to the Bound update module.

For the Br boundary update module, the input thereof is Bound1 from the Bound update module and the location of the reference rectangular block of pixels Br from the Br initialization module. When the present module has received N values of Bound1, Bound1(1), Bound1(2), . . . , Bound1 (N), which are obtained through calculating the pixels on the left boundary of Bt, then BrLeft=Maximum(Bound1 (1), Bound1(2), . . . , Bound1(N)), or BrLeft=Minimum(Bound1 (1), Bound1(2), . . . , Bound1(N)), or BrLeft=Median (Bound1(1), Bound1(2), . . . , Bound1(N)); and when the present module has received M values of Bound, Bound1(1), Bound1(2), . . . , Bound1(M), which are obtained through calculating the pixels on the right boundary of Bt, then BrRight=Maximum(Bound1 (1), Bound1(2), . . . , Bound1 (M)), or BrRight=Minimum(Bound1(1), Bound1 (2), . . . , Bound1 (M)), or BrRight=Median(Bound1(1), Bound1(2), . . . , Bound1(M)), wherein the return value of function Maximum(x1, x2, . . . , xK) is a maximum value of these numbers from x1 to xK, the return value of Minimum (x1, x2, . . . , xK) is a minimum value of these numbers from x1 to xK, and the return value of Median(x1, x2, . . . , xK) is a median value of these numbers from x1 to xK; and the Br boundary update module is configured to output Br to the mapping module.

The mapping module, the input of which is the depth information in the reference view and the reference rectangular block of pixels Br from the Br boundary update module, is configured to forward project Br to the target view by utilizing the depth information of the reference view so as to obtain the projected rectangular block of pixels Bs; and output Bs to the predicted picture acquisition module.

The predicted picture acquisition module, the input of which is the location of the predicted picture and the projected rectangular block of pixels Bs from the mapping module, is configured to acquire the predicted picture from Bs according to the location of the predicted picture, wherein the predicted picture is smaller than or equal to Bs, and when the predicted picture is smaller than Bs, pixels at corresponding locations are intercepted from Bs according to the location of the predicted picture to form the predicted picture; and output the predicted picture.

Embodiment 7

Figure 9:
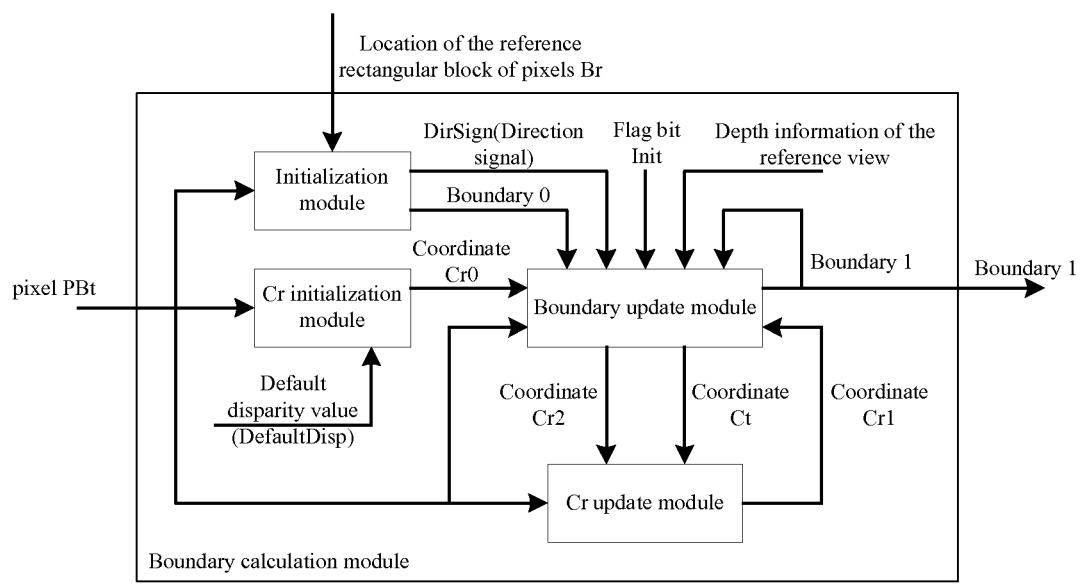
FIG. 9 is an alternative schematic diagram of a Bound calculation module in a block-based device for generating a predicted picture according to embodiment 7 of the present invention.
Figure 10:
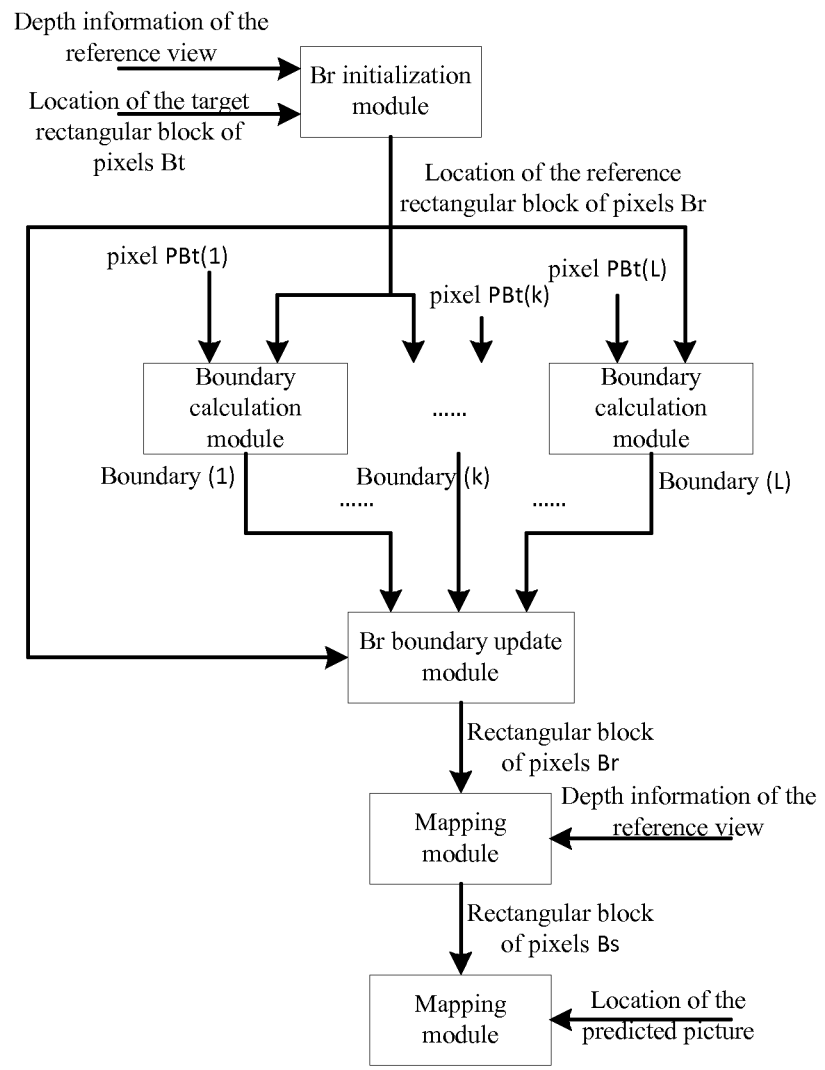
FIG. 10 is an alternative schematic diagram of a block-based device for generating a predicted picture according to embodiment 7 of the present invention.

In the present embodiment, provided is block-based device for generating a predicted picture, by means of which device Bounds corresponding to a plurality of pixels can be generated in parallel, and as shown in FIG. 10, the device comprises a Br initialization module, a Bound calculation module, a Br boundary update module, a mapping module and a predicted picture acquisition module. The Bound update module (as shown in FIG. 9) comprises submodules such as an initialization module, a Cr initialization module, a Bound update module and a Cr update module.

The Bound update module, the input of which is the pixel PBt and the location of the reference rectangular block of pixels Br from the Br initialization module, is configured to output Bound1 to the Br boundary update module.

For the initialization module, the input thereof is the pixel PBt and the location of the reference rectangular block of pixels Br. If PBt is located on the left boundary of Bt, DirSign is assigned to be a negative number, for example, DirSign=−1, and Bound0 is assigned to be the left boundary value, BrLeft, of the reference rectangular block of pixels Br, i.e. Bound0=BrLeft; otherwise, DirSign is assigned to be a positive number, for example, DirSign=1, and Bound0 is assigned to be the right boundary value, BrRight, of Br, i.e. Bound0=BrRight; the initialization module is configured to output Bound0 and DirSign to the Bound update module.

For the Cr initialization module, the input thereof is the pixel PBt and the default disparity value DefaultDisp, wherein coordinate Cr0 is equal to a coordinate obtained after offsetting the coordinate of PBt in the horizontal direction by DefaultDisp, the coordinate value of PBt is denoted as (XPBt, YPBt) and the coordinate value of Cr0 is denoted as (XCr0, YCr0), then XCr0=XPBt−DefaultDisp, YCr0=YPBt, the value of DefaultDisp can be a disparity value corresponding to a depth value of 128 or other depth values between the reference view and the target view. The Cr initialization module is configured to output Cr0 to the Bound update module.

For the Bound update module, the input thereof is depth information of the reference view, the pixel PBt, a flag bit Init, the coordinate Cr0 from the Cr initialization module, DirSign and Bound0 from the initialization module, Bound1 from the Bound update module and the coordinate Cr1 from the Cr update module, wherein the coordinate value of Cr is (XCr, YCr) and the coordinate value of Cr1 is (XCr1, YCr1); when Init is equal to 0, Bound is assigned to be Bound0 and Cr is assigned to be Cr0, i.e. Bound=Bound0, XCr=XCr0, YCr=YCr0; otherwise, Bound is assigned to be Bound1 and Cr is assigned to be Cr1, i.e. Bound=Bound1, XCr=XCr1, YCr=YCr1. Init represents whether the present module has received data from the initialization module and the Cr initialization module, if not received, Init is equal to 0, otherwise, Init is equal to 1; the Bound update module is configured to calculate a projection coordinate Ct of PCr in the target view according to a projection relationship by combining a pixel PCr located at Cr with depth information corresponding to PCr, the coordinate value of Ct is (XCt, YCt), and if the product of a horizontal coordinate difference value between Ct and PBt and DirSign, (XCt−XPBt)*DirSign≥0, and Init=1, the product of a difference value between a horizontal coordinate value of Cr and Bound and DirSign also satisfies (XCr−Bound)*DirSign<0, then update Bound to be the horizontal coordinate value of Cr, i.e. Bound=XCr; assign Bound1 to be Bound (i.e. Bound1=Bound) and output the assigned Bound1 to the Bound update module and the Br boundary update module, and assign Cr2 to be Cr (the coordinate value of Cr2 is (XCr2, YCr2)=(XCr, YCr)) and output assigned Cr2 to the Cr update module, and output Ct to the Cr update module.

The Cr update module, the input of which is the pixel PBt, the coordinate Cr2 and coordinate Ct from the Bound update module, is configured to update Cr1 to be a coordinate obtained after offsetting Cr2 in the horizontal direction by ShiftDisp, i.e. (XCr1, YCr1)=(XCr2−ShiftDisp, YCr2), wherein the value of ShiftDisp is determined by a horizontal coordinate difference value between Ct and PBt, for example, ShiftDisp=a*(XCt−XPBt)+b, both a and b are real numbers, the value of a may be 1, −1, 0, 1.5, −1.5, etc.; and the value of b can be 1, −1, 0, etc.; output Cr1 to the Bound update module.

The Br initialization module, the input of which is the location of the target rectangular block of pixels Bt in the target view and depth information in the reference view, is configured to determine the reference rectangular block of pixels Br in the reference view: the left boundary value, BrLeft, of Br is assigned to be a value obtained after offsetting the left boundary, BtLeft, of Bt by MaxDisparity, i.e. BrLeft=BtLeft−MaxDisparity; the right boundary, BrRight, of Br is assigned to be a location obtained after offsetting the right boundary, BtRight, of Bt by MinDisparity, i.e. BrRight=BtRight−MinDisparity; and the upper boundary value of Br is assigned to be the upper boundary value of Bt, and the lower boundary value of Br is assigned to be the lower boundary value of Bt; MaxDisparity and MinDisparity are respectively the maximum disparity value and the minimum disparity value between the reference view and the target view; output the location of Br to the Bound calculation module and the Br boundary update module.

For the Br boundary update module, the input thereof is Bound(1) to Bound(L) from the Bound update module and the location of the reference rectangular block of pixels Br from the Br initialization module. When the present module has received N values of Bound1, Bound1(1), Bound(2), . . . , Bound(N), which are obtained through calculating the pixels on the left boundary of Bt, then BrLeft=Maximum(Bound(1), Bound(2), . . . , Bound(N)), or BrLeft=Minimum(Bound(1), Bound(2), . . . , Bound(N)), or BrLeft=Median(Bound(1), Bound(2), . . . , Bound(N)); and when the present module has received M values of Bound, Bound(1), Bound(2), . . . , Bound(M), which are obtained through calculating the pixels on the right boundary of Bt, then BrRight=Maximum(Bound(1), Bound(2), . . . , Bound(M)), or BrRight=Minimum(Bound(1), Bound(2), . . . , Bound(M)), or BrRight=Median(Bound(1), Bound(2), . . . , Bound(M)), where N+M=L; where the return value of function Maximum(x1, x2, . . . , xK) is a maximum value of these numbers from x1 to xK, the return value of Minimum (x1, x2, . . . , xK) is a minimum value of these numbers from x1 to xK, and the return value of Median(x1, x2, . . . , xK) is a median value of these numbers from x1 to xK; and output Br to the mapping module.

The mapping module, the input of which is the depth information of the reference view and the reference rectangular block of pixels Br from the Br boundary update module, is configured to forward project Br to the target view by utilizing the depth information of the reference view so as to obtain the projected rectangular block of pixels Bs; and output Bs to the predicted picture acquisition module.

The predicted picture acquisition module, the input of which is the location of the predicted picture and the projected rectangular block of pixels Bs from the mapping module, is configured to acquire the predicted picture from Bs according to the location of the predicted picture, wherein the predicted picture is smaller than or equal to Bs, and when the predicted picture is smaller than Bs, pixels at corresponding locations are intercepted from Bs according to the location of the predicted picture to form the predicted picture; and output the predicted picture.

Embodiment 8

In the present embodiment, provided is media content, wherein the process for the media content to generate a picture can be implemented by means of any one of the block-based methods for generating a predicted picture in embodiments 1-3.

In the above-mentioned alternative embodiments, the predicted picture may also generate a new predicted picture through processing methods such as downsampling and sub-pixel interpolation.

In another embodiment, also provided is a software, wherein the software is configured to execute the technical solutions described in the above-mentioned embodiments and alternative embodiments.

In another embodiment, also provided is a storage medium, wherein the storage medium stores the above-mentioned software, and the storage medium comprises, but is not limited to: a compact disc, a floppy disk, a hard disk, an erasable memory, etc.

From the above description, it can be seen that the embodiments of present invention achieves the following technical effects: proposed is a new method for generating a predicted picture, and when a reference rectangular block of pixels is generated, only the location of a target rectangular block of pixels and/or depth information of a reference view and/or camera parameters of a target view need to be used, without needing to determine the reference rectangular block of pixels by means of a depth picture of the target view; and during forward projection, the determination is made by means of the depth information of the reference view, without needing to know the depth picture of the target view in the entire process. By means of the above-mentioned method, the technical problem that the dependence on data is relative large caused by the reason that a depth picture of a target view and a depth picture of a reference view need to be used at the same time during the process of generating the predicted picture in the prior art is solved, and the technical effects of reducing the dependence on data and improving the encoding and decoding efficiency are achieved.

Obviously, those skilled in the art should know that each of the mentioned modules or steps of the present invention can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the present invention is not restricted to any particular hardware and software combination.

The descriptions above are only the preferable embodiment of the present invention, which are not used to restrict the present invention, for those skilled in the art, the present invention may have various changes and variations. Any amendments, equivalent substitutions, improvements, etc. within the principle of the present invention are all included in the scope of the protection of the present invention.

What is claimed is:

1. A method for generating a predicted picture, comprising:
    a hardware processor determining a reference rectangular block of pixels according to parameter information, wherein the parameter information comprises a location of a target rectangular block of pixels and/or depth information of a reference view;
    the hardware processor mapping the reference rectangular block of pixels to a target view by means of the depth information of the reference view to obtain a projected rectangular block of pixels; and
    the hardware processor acquiring a predicted picture block from the projected rectangular block of pixels;
    wherein, when the parameter information comprises the location of the target rectangular block of pixels, the hardware processor determining the reference rectangular block of pixels according to the parameter information comprises: taking a value which is obtained after subtracting a first predetermined offset value from a left boundary value of the target rectangular block of pixels as a left boundary value of the reference rectangular block of pixels; taking a value which is obtained after subtracting a second predetermined offset value from a right boundary value of the target rectangular block of pixels as a right boundary value of the reference rectangular block of pixels; taking an upper boundary value of the target rectangular block of pixels as an upper boundary value of the reference rectangular block of pixels; taking a lower boundary value of the target rectangular block of pixels as a lower boundary value of the reference rectangular block of pixels; and taking the determined left boundary value, right boundary value, upper boundary value and lower boundary value of the reference rectangular block of pixels as boundary information of the reference rectangular block of pixels, so as to determine the reference rectangular block of pixels in the reference view.

2. The method according to claim 1, wherein the depth information of the reference view comprises at least one of the following: depth pictures of the reference view and camera parameters of the reference view.

3. The method according to claim 1, wherein a forward projection is used in the process of mapping the reference rectangular block of pixels to a target view by means of the depth information of the reference view.

4. The method according to claim 1, wherein, when the parameter information comprises the location of the target rectangular block of pixels and the depth information of the reference view, the hardware processor determining the reference rectangular block of pixels according to the parameter information comprises:
    determining a first set of boundary values of the reference rectangular block of pixels according to the location of the target rectangular block of pixels;
    updating the first set of boundary values according to the depth information of the reference view, and taking results obtained after the update as a second set of boundary values of the reference rectangular block of pixels, wherein the area of the reference rectangular block of pixels corresponding to the second set of boundary values is smaller than the area of the reference rectangular block of pixels corresponding to the first set of boundary values; and
    determining the reference rectangular block of pixels in the reference view according to the second set of boundary values.

5. The method according to claim 4, wherein determining a first set of boundary values of the reference rectangular block of pixels according to the location of the target rectangular block of pixels comprises:
    taking a value which is obtained after subtracting a third predetermined offset value from the left boundary value of the target rectangular block of pixels as a left boundary value in the first set of boundary values of the reference rectangular block of pixels;
    taking a value which is obtained after subtracting a fourth predetermined offset value from the right boundary value of the target rectangular block of pixels as a right boundary value in the first set of boundary values of the reference rectangular block of pixels;
    taking the upper boundary value of the target rectangular block of pixels as an upper boundary value of the first set of boundary values; and
    taking the lower boundary value of the target rectangular block of pixels as a lower boundary value of the first set of boundary values.

6. The method according to claim 5, wherein updating the first set of boundary values according to the depth information of the reference view comprises:
    determining one or more boundary range values according to location information of one or more pixels on boundaries of the target rectangular block of pixels and the depth information of the reference view, wherein the boundary range values comprise left boundary range values and/or right boundary range values; and
    updating the first set of boundary values according to the determined one or more boundary range values.

7. The method according to claim 6, wherein
    the steps of determining one or more left boundary range values according to the location information of one or more pixels on the boundaries of the target rectangular block of pixels and the depth information of the reference view comprise:
    selecting one pixel on the left boundary of the target rectangular block of pixels as a first pixel;

taking the left boundary value in the first set of boundary values as the left boundary range value corresponding to the first pixel;

taking a first coordinate obtained after offsetting the coordinate of the first pixel by one default disparity as a second coordinate in the reference view;

determining a first projection coordinate of a pixel corresponding to the second coordinate in the target view according to depth information of a pixel corresponding to the second coordinate in the reference view; and when a horizontal component of the first projection coordinate is less than or equal to the left boundary value in the first set of boundary values, updating the left boundary range value corresponding to the first pixel to be a horizontal component of the second coordinate;

and/or determining one or more right boundary range values according to the location information of one or more pixels on the boundaries of the target rectangular block of pixels and the depth information of the reference view comprises:

selecting one pixel on the right boundary of the target rectangular block of pixels as a second pixel;

taking the right boundary value in the first set of boundary values as the right boundary range value corresponding to the second pixel;

taking a third coordinate obtained after offsetting the coordinate of the second pixel by one default disparity as a fourth coordinate in the reference view;

determining a second projection coordinate of a pixel corresponding to the fourth coordinate in the target view according to depth information of a pixel corresponding to the fourth coordinate in the reference view; and when a horizontal component of the second projection coordinate is greater than or equal to the right boundary value in the first set of boundary values, updating the right boundary range value corresponding to the second pixel to be a horizontal component of the fourth coordinate.

8. The method according to claim 7, wherein, when it is judged that the condition that the horizontal component of the first projection coordinate is less than or equal to the left boundary value in the first set of boundary values is not satisfied, or after the left boundary range value corresponding to the first pixel is updated to be the horizontal component of the second coordinate, the method further comprises:

updating the left boundary range value corresponding to the first pixel;

and/or when it is judged that the condition that the horizontal component of the second projection coordinate is greater than or equal to the right boundary value in the first set of boundary values is not satisfied, or after the right boundary range value corresponding to the second pixel is updated to be the horizontal component of the fourth coordinate, the method further comprises:

updating the right boundary range value corresponding to the second pixel.

9. The method according to claim 8, wherein updating the left boundary range value corresponding to the first pixel comprises:

updating the second coordinate to be a coordinate obtained after offsetting the current second coordinate by a fifth predetermined offset value;

determining a third projection coordinate of the pixel corresponding to the current second coordinate in the target view according to the depth information of the pixel corresponding to the current second coordinate in the reference view; and when a horizontal component of the third projection coordinate is less than or equal to the left boundary value in the first set of boundary values, and the horizontal component of the current second coordinate is greater than the left boundary range value corresponding to the current first pixel, updating the left boundary range value corresponding to the first pixel to be the horizontal component of the current second coordinate;

and/or updating the right boundary range value corresponding to the second pixel comprises:

updating the fourth coordinate to be a coordinate obtained after offsetting the current fourth coordinate by a sixth predetermined offset value;

determining a fourth projection coordinate of the pixel corresponding to the current fourth coordinate in the target view according to the depth information of the pixel corresponding to the current fourth coordinate in the reference view; and when a horizontal component of the fourth projection coordinate is greater than or equal to the right boundary value in the first set of boundary values, and the horizontal component of the current fourth coordinate is greater than the right boundary range value corresponding to the second pixel, updating the right boundary range value corresponding to the second pixel to be the horizontal component of the current fourth coordinate.

10. The method according to claim 9, wherein the step of updating the left boundary range value corresponding to the first pixel is repeatedly executed a predetermined number of times, and/or the step of updating the left boundary range value corresponding to the second pixel is repeatedly executed a predetermined number of times.

11. The method according to claim 9, wherein the fifth predetermined offset value is determined by a difference value between the horizontal component of the coordinate of the first pixel and the horizontal component of the projection coordinate of the pixel corresponding to the second coordinate in the target view, and/or the sixth predetermined offset value is determined by a difference value between the horizontal component of the coordinate of the second pixel and the horizontal component of the projection coordinate of the pixel corresponding to the second coordinate in the target view.

12. The method according to claim 7, wherein determining a plurality of left boundary range values according to the location information of one or more pixels on the boundaries of the target rectangular block of pixels and the depth information of the reference view comprises:

determining, in a parallel mode, the plurality of left boundary range values according to the location information of the one or more pixels on the boundaries of the target rectangular block of pixels and the depth information of the reference view;

and/or determining a plurality of right boundary range values according to the location information of one or more pixels on the boundaries of the target rectangular block of pixels and the depth information of the reference view comprises:
  determining, in a parallel mode, the plurality of right boundary range values according to the location information of the one or more pixels on the boundaries of the target rectangular block of pixels and the depth information of the reference view.

13. A device for generating a predicted picture, comprising: a hardware processor, configured to perform programming components stored in a memory, wherein the programming components comprise:
  a reference rectangular block of pixels determination module, connected to a mapping module and configured to determine a reference rectangular block of pixels according to parameter information, wherein the parameter information comprises a location of a target rectangular block of pixels and/or depth information of a reference view;
  the mapping module, connected to a predicted picture acquisition module and configured to map the reference rectangular block of pixels to a target view by means of the depth information of the reference view to obtain a projected rectangular block of pixels; and
  the predicted picture acquisition module, connected to the mapping module and configured to acquire a predicted picture block from the projected rectangular block of pixels;
  wherein, when the parameter information comprises the location of the target rectangular block of pixels, the reference rectangular block of pixels determination module is further configured to take a value which is obtained after subtracting a first predetermined offset value from a left boundary value of the target rectangular block of pixels as a left boundary value of the reference rectangular block of pixels; take a value which is obtained after subtracting a second predetermined offset value from a right boundary value of the target rectangular block of pixels as a right boundary value of the reference rectangular block of pixels; take an upper boundary value of the target rectangular block of pixels as an upper boundary value of the reference rectangular block of pixels; take a lower boundary value of the target rectangular block of pixels as a lower boundary value of the reference rectangular block of pixels; and take the determined left boundary value, right boundary value, upper boundary value and lower boundary value of the reference rectangular block of pixels as boundary information of the reference rectangular block of pixels, so as to determine the reference rectangular block of pixels in the reference view.

14. The device according to claim 13, wherein the depth information of the reference view comprises at least one of the following: depth pictures of the reference view and camera parameters of the reference view.

15. The device according to claim 13, wherein a forward projection is used in the process in which the mapping module maps the reference rectangular block of pixels to a target view by means of the depth information of the reference view.

16. The device according to claim 13, wherein the reference rectangular block of pixels determination module comprises:
  a first determination unit, connected to an update unit and configured to determine a first set of boundary values of the reference rectangular block of pixels according to the location of the target rectangular block of pixels when the parameter information comprises the location of the target rectangular block of pixels and the depth information of the reference view;
  the update unit, connected to a second determination unit and configured to update the first set of boundary values according to the depth information of the reference view, and take results obtained after the update as a second set of boundary values of the reference rectangular block of pixels, wherein the area of the reference rectangular block of pixels corresponding to the second set of boundary values is smaller than the area of the reference rectangular block of pixels corresponding to the first set of boundary values; and
  the second determination unit, connected to the update unit and configured to determine the reference rectangular block of pixels in the reference view according to the second set of boundary values.

17. The device according to claim 16, wherein the first determination unit comprises:
  a left boundary value determination sub-unit, configured to take a value which is obtained after subtracting a third predetermined offset value from the left boundary value of the target rectangular block of pixels as a left boundary value in the first set of boundary values of the reference rectangular block of pixels;
  a right boundary value determination sub-unit, configured to take a value which is obtained after subtracting a fourth predetermined offset value from the right boundary value of the target rectangular block of pixels as a right boundary value in the first set of boundary values of the reference rectangular block of pixels;
  an upper boundary value determination sub-unit, configured to take the upper boundary value of the target rectangular block of pixels as an upper boundary value of the first set of boundary values; and
  a lower boundary value determination sub-unit, configured to take the lower boundary value of the target rectangular block of pixels as a lower boundary value of the first set of boundary values.

18. The device according to claim 16, wherein the update unit comprises:
  a boundary range value determination sub-unit, configured to determine one or more boundary range values according to location information of one or more pixels on boundaries of the target rectangular block of pixels and the depth information of the reference view, wherein the boundary range values comprise left boundary range values and/or right boundary range values; and
  an update sub-unit, configured to update the first set of boundary values according to the determined one or more boundary range values.

19. The device according to claim 18, wherein
  the boundary range value determination sub-unit is further configured to determine one or more left boundary range values in the following way:
  selecting one pixel on the left boundary of the target rectangular block of pixels as a first pixel;
  taking the left boundary value in the first set of boundary values as the left boundary range value corresponding to the first pixel;
  taking a first coordinate obtained after offsetting the coordinate of the first pixel by one default disparity as a second coordinate in the reference view;
  determining a first projection coordinate of a pixel corresponding to the second coordinate in the target view according to depth information of a pixel corresponding to the second coordinate in the reference view; and when a horizontal component of the first projection coordinate is less than or equal to the left boundary value in the first set of boundary values, updating the left boundary range value corresponding to the first pixel to be a horizontal component of the second coordinate;

and/or the boundary range value determination sub-unit is further configured to determine one or more right boundary range values in the following way:

selecting one pixel on the right boundary of the target rectangular block of pixels as a second pixel;

taking the right boundary value in the first set of boundary values as the right boundary range value corresponding to the second pixel;

taking a third coordinate obtained after offsetting the coordinate of the second pixel by one default disparity as a fourth coordinate in the reference view;

determining a second projection coordinate of a pixel corresponding to the fourth coordinate in the target view according to depth information of a pixel corresponding to the fourth coordinate in the reference view; and when a horizontal component of the second projection coordinate is greater than or equal to the right boundary value in the first set of boundary values, updating the right boundary range value corresponding to the second pixel to be a horizontal component of the fourth coordinate.

* * * * *